US012441745B2

(12) United States Patent
Markey

(10) Patent No.: US 12,441,745 B2
(45) Date of Patent: Oct. 14, 2025

(54) PROCESSES AND COMPOUNDS

(71) Applicant: Radius Pharmaceuticals, Inc., Boston, MA (US)

(72) Inventor: Michael Markey, Northborough, MA (US)

(73) Assignee: RADIUS PHARMACEUTICALS, INC., Boston, MA (US)

(*) Notice: Subject to any disclaimer, the term of this patent is extended or adjusted under 35 U.S.C. 154(b) by 1087 days.

(21) Appl. No.: 17/430,248

(22) PCT Filed: Feb. 11, 2020

(86) PCT No.: PCT/US2020/017777
§ 371 (c)(1),
(2) Date: Aug. 11, 2021

(87) PCT Pub. No.: WO2020/167855
PCT Pub. Date: Aug. 20, 2020

(65) Prior Publication Data
US 2022/0162233 A1    May 26, 2022

Related U.S. Application Data

(60) Provisional application No. 62/804,391, filed on Feb. 12, 2019.

(51) Int. Cl.
| C07F 5/02 | (2006.01) |
| C07C 213/08 | (2006.01) |
| C07C 217/04 | (2006.01) |
| C07C 231/12 | (2006.01) |
| C07C 233/25 | (2006.01) |
| C07C 235/78 | (2006.01) |
| C07C 237/20 | (2006.01) |

(52) U.S. Cl.
CPC ............ *C07F 5/025* (2013.01); *C07C 213/08* (2013.01); *C07C 217/04* (2013.01); *C07C 231/12* (2013.01); *C07C 233/25* (2013.01); *C07C 235/78* (2013.01); *C07C 237/20* (2013.01)

(58) Field of Classification Search
None
See application file for complete search history.

(56) References Cited

U.S. PATENT DOCUMENTS

| 4,102,671 A | 7/1978 | Haddock |
| 5,411,981 A | 5/1995 | Gaillard-Kelly |
| 5,589,452 A | 12/1996 | Krstenansky et al. |
| 5,691,312 A | 11/1997 | Paques |
| 5,693,616 A | 12/1997 | Krstenansky et al. |
| 5,695,955 A | 12/1997 | Krstenansky et al. |
| 5,723,577 A | 3/1998 | Dong |
| 5,798,225 A | 8/1998 | Krstenansky et al. |
| 5,807,823 A | 9/1998 | Krstenansky et al. |
| 5,821,225 A | 10/1998 | Vickery |
| 5,840,837 A | 11/1998 | Krstenansky et al. |
| 5,874,086 A | 2/1999 | Krstenansky et al. |
| 5,886,225 A | 3/1999 | Jalett et al. |
| 5,955,574 A | 9/1999 | Dong |
| 5,969,095 A | 10/1999 | Dong |
| 5,977,070 A | 11/1999 | Piazza et al. |
| 6,017,924 A | 1/2000 | Edwards |
| 6,050,988 A | 4/2000 | Zuck |
| 6,051,686 A | 4/2000 | Krstenansky et al. |
| 6,083,196 A | 7/2000 | Trautman et al. |
| 6,091,975 A | 7/2000 | Daddona et al. |
| 6,120,761 A | 9/2000 | Yamazaki et al. |
| 6,136,784 A | 10/2000 | L'Italien et al. |
| 6,156,899 A | 12/2000 | Galey et al. |
| 6,316,410 B1 | 11/2001 | Barbier et al. |
| 6,526,316 B2 | 2/2003 | Iga |
| 6,544,949 B1 | 4/2003 | Dong |
| 6,583,114 B2 | 6/2003 | Vickery |
| 6,670,386 B2 | 12/2003 | Sun et al. |
| 6,740,522 B2 | 5/2004 | Anderson |
| 6,740,650 B2 | 5/2004 | Lovie et al. |
| 6,756,375 B2 | 6/2004 | Veeneman |
| 6,756,480 B2 | 6/2004 | Kostenuik et al. |
| 6,770,623 B1 | 8/2004 | Chang et al. |
| 6,849,710 B1 | 2/2005 | Arzeno |
| 6,881,203 B2 | 4/2005 | Delmore et al. |
| 6,921,750 B2 | 7/2005 | Dong |
| 6,933,321 B2 | 8/2005 | Labrie |
| 7,056,886 B2 | 6/2006 | Isaacs |

(Continued)

FOREIGN PATENT DOCUMENTS

| CA | 2234724 | 10/1996 |
| CN | 106132419 A | 11/2016 |

(Continued)

OTHER PUBLICATIONS

PCT/US2020/017777 International Search Report dated Jul. 6, 2020.
"Deuterium." In http://www.britannica.com. Retrieved Feb. 18, 18, 2009 from <http://www.britannica.com/Ebchecked/topic/159684/deuterium>.
Acevedo et al., "Selective Androgen Receptor Modulators Antagonize ApolipoproteinE4-Induced Cognitive Impairments," Letters in Drug Design & Discovery, 2008, 5, 271-276.
Allan et al., "A selective androgen receptor modulator that reduces prostate tumor size and prevents orchidectomy-induced bone loss in rats," Journal of Steroid Biochemistry & Molecular Biology, 2007, 103, 76-83.
Allan et al., "A selective androgen receptor modulator with minimal prostate hypertrophic activity enhances lean body mass in male rats and stimulates sexual behavior in female rats," Endocr., 2007, 32:41-51.

(Continued)

*Primary Examiner* — Jeffrey S Lundgren
*Assistant Examiner* — Anthony Joseph Seitz
(74) *Attorney, Agent, or Firm* — Honigman LLP; Christopher C. Forbes

(57) ABSTRACT

Useful processes of preparation and intermediates useful for the preparation of Compound 1, a selective estrogen receptor alpha (ERα) modulator/degrader (SERM/SERD), having utility for the treatment of ER+ cancers including breast cancer are described.

16 Claims, No Drawings

(56) References Cited

U.S. PATENT DOCUMENTS

| | | |
|---|---|---|
| 7,097,631 B2 | 8/2006 | Trautman |
| 7,097,834 B1 | 8/2006 | Boyle |
| 7,138,426 B2 | 11/2006 | Dininno |
| 7,141,544 B2 | 11/2006 | Somers et al. |
| 7,172,999 B2 | 2/2007 | Mattern et al. |
| 7,186,683 B2 | 3/2007 | Henriksen |
| 7,214,381 B2 | 5/2007 | Carrara |
| 7,244,709 B2 | 7/2007 | Quay et al. |
| 7,256,208 B2 | 8/2007 | Bi et al. |
| 7,282,507 B2 | 10/2007 | Lanter et al. |
| 7,335,377 B2 | 2/2008 | Stern |
| 7,363,075 B2 | 4/2008 | Stern |
| 7,364,736 B2 | 4/2008 | Boyle et al. |
| 7,365,202 B2 | 4/2008 | Tan et al. |
| 7,371,721 B2 | 5/2008 | Henriksen et al. |
| 7,383,084 B2 | 6/2008 | Stern |
| 7,388,027 B2 | 6/2008 | Li et al. |
| 7,390,923 B2 | 6/2008 | Ratilainen |
| 7,405,234 B2 | 7/2008 | Sun et al. |
| 7,410,948 B2 | 8/2008 | Dong |
| 7,411,039 B2 | 8/2008 | Thim et al. |
| 7,411,050 B2 | 8/2008 | Anderson |
| 7,465,809 B2 | 12/2008 | Zhang et al. |
| 7,514,470 B2 | 4/2009 | Turnbull et al. |
| 7,537,795 B2 | 5/2009 | Cormier |
| 7,556,821 B2 | 7/2009 | Ameri |
| 7,558,625 B2 | 7/2009 | Levin |
| 7,566,733 B2 | 7/2009 | Ng et al. |
| 7,572,820 B2 | 8/2009 | Turnbull et al. |
| 7,579,013 B2 | 8/2009 | Ameri |
| 7,585,877 B2 | 9/2009 | Schlienger et al. |
| 7,612,114 B2 * | 11/2009 | Hamaoka ............ C07D 213/64 564/307 |
| 7,622,592 B2 | 11/2009 | Kim et al. |
| 7,625,923 B2 | 12/2009 | Nirschl et al. |
| 7,632,858 B2 | 12/2009 | Hamann et al. |
| 7,662,404 B2 | 2/2010 | Stern |
| 7,696,227 B2 | 4/2010 | Diamond et al. |
| 7,696,241 B2 | 4/2010 | Li et al. |
| 7,741,352 B2 | 6/2010 | Brown et al. |
| 7,795,280 B2 | 9/2010 | Hermkens et al. |
| 7,799,757 B2 | 9/2010 | Chorev et al. |
| 7,803,770 B2 | 9/2010 | Dey |
| 7,807,691 B2 | 10/2010 | Gavardinas et al. |
| 7,812,036 B2 | 10/2010 | Van Der Louw et al. |
| 7,820,702 B2 | 10/2010 | Hamann et al. |
| 7,829,589 B2 | 11/2010 | Saunders et al. |
| 7,834,051 B2 | 11/2010 | Hasuoka |
| 7,834,063 B2 | 11/2010 | Turnbull et al. |
| 7,846,488 B2 | 12/2010 | Johnson et al. |
| 7,906,137 B2 | 3/2011 | Byun et al. |
| 7,932,399 B2 | 4/2011 | Alford et al. |
| 7,935,722 B2 | 5/2011 | Fales et al. |
| 7,968,587 B2 | 6/2011 | Gavardinas et al. |
| 8,041,421 B2 | 10/2011 | Birchall |
| 8,067,448 B2 | 11/2011 | Miller |
| 8,110,562 B2 | 2/2012 | Dalton et al. |
| 8,133,505 B2 | 3/2012 | Stern |
| 8,143,425 B2 | 3/2012 | Ewing et al. |
| 8,148,333 B2 | 4/2012 | Dey |
| 8,217,032 B2 | 7/2012 | Dally et al. |
| 8,329,649 B2 | 12/2012 | Asada et al. |
| 8,399,520 B2 | 3/2013 | Hamaoka |
| 8,450,481 B2 | 5/2013 | Masliah et al. |
| 8,486,943 B2 | 7/2013 | Jadhav et al. |
| 8,501,814 B2 | 8/2013 | Ratilainen et al. |
| 8,519,158 B2 | 8/2013 | Zhi et al. |
| 8,592,452 B2 | 11/2013 | Yamamoto |
| 8,632,801 B2 | 1/2014 | Ameri et al. |
| 8,748,382 B2 | 6/2014 | Dey |
| 8,933,130 B2 | 1/2015 | Lytde |
| 8,980,272 B2 | 3/2015 | Nomiyama |
| 8,987,319 B2 | 3/2015 | Miller |
| 9,133,182 B2 | 9/2015 | Miller |
| 9,139,520 B2 | 9/2015 | Zhi |
| 9,284,345 B2 | 3/2016 | Labrie et al. |
| 9,421,264 B2 | 8/2016 | Wardell et al. |
| 9,549,746 B2 | 1/2017 | Woolfson et al. |
| 9,555,014 B2 | 1/2017 | O'Dea et al. |
| 9,623,087 B2 | 4/2017 | Zhang et al. |
| 9,687,641 B2 | 6/2017 | Singh et al. |
| 9,693,950 B2 | 7/2017 | Determan et al. |
| 10,010,706 B2 | 7/2018 | Gonzalez et al. |
| 10,238,848 B2 | 3/2019 | Singh et al. |
| 2002/0013297 A1 | 1/2002 | Kaltenbach, III et al. |
| 2002/0077281 A1 | 6/2002 | Vickery |
| 2002/0107505 A1 | 8/2002 | Holladay |
| 2002/0177839 A1 | 11/2002 | Cormier et al. |
| 2003/0039654 A1 | 2/2003 | Kostenuik et al. |
| 2003/0063859 A1 | 4/2003 | Hamanaka |
| 2003/0135150 A1 | 7/2003 | Kuribayashi |
| 2003/0143276 A1 | 7/2003 | Hsia |
| 2003/0181936 A1 | 9/2003 | Trautman et al. |
| 2004/0214996 A1 | 10/2004 | Kostenuik et al. |
| 2004/0265354 A1 | 12/2004 | Ameri et al. |
| 2004/0265365 A1 | 12/2004 | Daddona et al. |
| 2005/0000309 A1 | 1/2005 | Perni et al. |
| 2005/0009739 A1 | 1/2005 | Wang et al. |
| 2005/0032698 A1 | 2/2005 | Day et al. |
| 2005/0096586 A1 | 5/2005 | Trautman |
| 2005/0106209 A1 | 5/2005 | Ameri |
| 2005/0106227 A1 | 5/2005 | Zalipsky et al. |
| 2005/0112135 A1 | 5/2005 | Cormier et al. |
| 2005/0124537 A1 | 6/2005 | Kostenuik et al. |
| 2005/0124625 A1 | 6/2005 | Salvati et al. |
| 2005/0209144 A1 | 9/2005 | Billger et al. |
| 2005/0210080 A1 | 9/2005 | Saika et al. |
| 2005/0222100 A1 | 10/2005 | Kloosterboer |
| 2005/0250749 A1 | 11/2005 | Labrie |
| 2005/0261631 A1 | 11/2005 | Clarke et al. |
| 2005/0276823 A1 | 12/2005 | Cini et al. |
| 2005/0282749 A1 | 12/2005 | Henriksen et al. |
| 2006/0115472 A1 | 6/2006 | Li et al. |
| 2006/0142387 A1 | 6/2006 | Cadilla et al. |
| 2006/0148893 A1 | 7/2006 | Blanc et al. |
| 2006/0188555 A1 | 8/2006 | Cormier et al. |
| 2006/0211608 A1 | 9/2006 | Holick |
| 2007/0021216 A1 | 1/2007 | Guruparan |
| 2007/0021495 A1 | 1/2007 | Katzenellenbogen et al. |
| 2007/0034846 A1 | 2/2007 | Ratanasiriwilai |
| 2007/0129409 A1 | 6/2007 | Hu et al. |
| 2007/0155664 A1 | 7/2007 | Ranklove |
| 2007/0184096 A1 | 8/2007 | Ameri |
| 2007/0196395 A1 | 8/2007 | Mackerell et al. |
| 2007/0213543 A1 | 9/2007 | Rodriguez |
| 2007/0249520 A1 | 10/2007 | Gore et al. |
| 2007/0256736 A1 | 11/2007 | Tonkovich et al. |
| 2007/0287949 A1 | 12/2007 | Levin |
| 2007/0299009 A1 | 12/2007 | Dong |
| 2008/0008433 A1 | 1/2008 | Parker |
| 2008/0024456 A1 | 1/2008 | Peng et al. |
| 2008/0027096 A1 | 1/2008 | Garg et al. |
| 2008/0039775 A1 | 2/2008 | Ameri |
| 2008/0044033 A1 | 2/2008 | Ozawa |
| 2008/0045504 A1 | 2/2008 | Gant et al. |
| 2008/0051699 A1 | 2/2008 | Choi et al. |
| 2008/0058383 A1 | 3/2008 | Jernstedt et al. |
| 2008/0114048 A1 | 5/2008 | Sui |
| 2008/0119401 A1 | 5/2008 | Dong |
| 2008/0121602 A1 | 5/2008 | Zhang |
| 2008/0124000 A1 | 5/2008 | Sato et al. |
| 2008/0124402 A1 | 5/2008 | Kim et al. |
| 2008/0125399 A1 | 5/2008 | Wang et al. |
| 2008/0127717 A1 | 6/2008 | Lesieur |
| 2008/0194536 A1 | 8/2008 | Hammond et al. |
| 2008/0269685 A1 | 10/2008 | Singh et al. |
| 2009/0069226 A1 | 3/2009 | Ong et al. |
| 2009/0117158 A1 | 5/2009 | Ameri |
| 2009/0133861 A1 | 5/2009 | Kim |
| 2009/0170907 A1 | 7/2009 | Turnbull et al. |
| 2009/0198189 A1 | 8/2009 | Simons |
| 2009/0227498 A1 | 9/2009 | Dey et al. |
| 2009/0227571 A1 | 9/2009 | Loren et al. |
| 2009/0305965 A1 | 12/2009 | Kang et al. |

(56) References Cited

U.S. PATENT DOCUMENTS

| | | |
|---|---|---|
| 2009/0325930 A1 | 12/2009 | Hamaoka |
| 2010/0016223 A1 | 1/2010 | Gimona et al. |
| 2010/0030100 A1 | 2/2010 | Tokumoto et al. |
| 2010/0092566 A1 | 4/2010 | Alessi et al. |
| 2010/0105733 A1 | 4/2010 | Lyttle |
| 2010/0118287 A1 | 5/2010 | Kikuchi et al. |
| 2010/0119568 A1 | 5/2010 | Ameri |
| 2010/0151247 A1 | 6/2010 | Moore et al. |
| 2010/0152649 A1 | 6/2010 | Ameri |
| 2010/0160895 A1 | 6/2010 | Ameri |
| 2010/0203014 A1 | 8/2010 | Maggio |
| 2010/0221305 A1 | 9/2010 | Ameri |
| 2010/0226966 A1 | 9/2010 | Daddona |
| 2011/0006458 A1 | 1/2011 | Sagi et al. |
| 2011/0009387 A1 | 1/2011 | Basso-Porcaro |
| 2011/0046052 A1 | 2/2011 | Yang |
| 2011/0092425 A1 | 4/2011 | Dey |
| 2011/0124617 A1 | 5/2011 | Lyttle |
| 2011/0172609 A1 | 7/2011 | Moga |
| 2011/0213335 A1 | 9/2011 | Burton et al. |
| 2011/0276028 A1 | 11/2011 | Singh et al. |
| 2011/0288485 A1 | 11/2011 | Tokumoto |
| 2012/0150023 A1 | 6/2012 | Kasper et al. |
| 2012/0219538 A1 | 8/2012 | Borchard et al. |
| 2013/0006217 A1 | 1/2013 | Hattersley |
| 2013/0085105 A1 | 4/2013 | Deasy |
| 2013/0116232 A1 | 5/2013 | Kahraman |
| 2013/0123707 A1 | 5/2013 | Determan et al. |
| 2013/0157955 A1 | 6/2013 | Dey |
| 2014/0024582 A1 | 1/2014 | Yang |
| 2014/0046292 A1 | 2/2014 | Hattersley |
| 2014/0046293 A1 | 2/2014 | Hattersley |
| 2014/0228293 A1 | 8/2014 | Danishefsky et al. |
| 2014/0330198 A1 | 11/2014 | Zhang et al. |
| 2014/0343499 A1 | 11/2014 | Zhang |
| 2015/0231134 A1 | 8/2015 | Erichsen |
| 2015/0274640 A1 | 10/2015 | Wardell et al. |
| 2016/0324808 A1 | 11/2016 | Wardell et al. |
| 2018/0153828 A1 | 6/2018 | Garner et al. |
| 2018/0169101 A1 | 6/2018 | Hattersley |
| 2018/0186726 A1 | 7/2018 | Cruskie, Jr. et al. |
| 2018/0214393 A1 | 8/2018 | Hattersley |
| 2021/0052705 A1 | 2/2021 | Hattersley et al. |

FOREIGN PATENT DOCUMENTS

| | | |
|---|---|---|
| EA | 012262 B1 | 8/2009 |
| EP | 0226508 A1 | 6/1987 |
| EP | 0406734 A2 | 1/1991 |
| EP | 1577288 A1 | 9/2005 |
| JP | 1261381 | 10/1989 |
| JP | 03-024069 A | 2/1991 |
| WO | 1996/035447 A1 | 11/1996 |
| WO | 2001/036039 A2 | 5/2001 |
| WO | 2004/060386 A1 | 7/2004 |
| WO | 2004058682 A1 | 7/2004 |
| WO | 2008002490 A2 | 1/2008 |
| WO | 2009/053106 A1 | 4/2009 |
| WO | 2010/022176 A1 | 2/2010 |
| WO | 2011143469 A1 | 11/2011 |
| WO | 2012/075375 A1 | 6/2012 |
| WO | 2014/203129 A1 | 12/2014 |
| WO | 2016097071 A1 | 6/2016 |
| WO | 2016176666 A1 | 11/2016 |
| WO | 2018129419 A1 | 7/2018 |

OTHER PUBLICATIONS

Alluri, P.G., et al., Estrogen Receptor Mutations and Their Role in Breast Cancer Progression, Breast Cancer Research, 2014, 16:494.

Ameri, M., et al., (2010) "Parathyroid Hormone PTH(1-34) Formulation that Enables Uniform Coating on a Novel Transdermal Microprojection Delivery System," Pharmaceutical Res, 27(2):303-313; Feb. 2010 (published online Dec. 15, 2009).

Ameri, M., et al., "Demonstrated Solid-State Stability of Parathyroid Hormone PTH(1-34) Coated on a Novel Transdermal Microprojection Delivery System," Pharmaceutical Res, 26(11):2454-2463; Nov. 2009; (published online Sep. 3, 2009).

Amugongo, S. K., et al., (2014) "Effect of Sequential Treatments with Alendronate, Parathyroid Hormone (1-34) and Raloxifene on Cortical Bone Mass and Strength in Ovariectomized Rats," Bone 67:257-268.

Anderson, "The Process of Structure-Based Drug Design," Chemistry & Biology, 2003, vol. 10, 787-797.

Anonymous: Radius Announced today that It Has Acquired The License To Develop and Market RAD1901 in Japan, MPM Globe Newswire, Mar. 10, 2015, pp. 1-5, XP055683544; retrieved from: url:https://www.mpmcapital.com/press/radius-rdus-anounced-today-acquired-license-develop-market-rad1901-japan/; retrieved Apr. 7, 2020.

Arun, B., et al., "The Search for the Ideal SERM," *Expert. Opin. Pharmacother.*, 3(6):681-691 (2002).

Augustine, M. et al., (2013) "Parathyroid Hormone and Parathyroid Hormone-related Protein Analogs as Therapies for Osteoporosis," Curr. Osteoporos. Rep. 11(4):400-406.

Australian Patent Office, Examination Report for SG20090240-1 mailed Nov. 18, 2010.

Australian Patent Office, International Search Report and Written Opinion for SG20090240-1 completed Apr. 1, 2010 and mailed Apr. 20, 2010.

Autoimmune disorders: MedlinePlus Medical Encyclopedia [online], [retrieved on Jun. 3, 2011]. Retrieved from the Internet URL: http://www.nlm.nih.gov/medlineplus/ency/article/000816.htm.

Bellido, T. et al., (1999) "Estrogen Inhibit Apoptosis of Osteoblasts and Osteocytes through Rapid (Non-genomic) Activation of Extracellular Signal-Regulated Kinases (ERKs)," J Bone Mineral Res, 14(Supp 1)(Abstract SA135):S342.

Berge et al., "Pharmaceutical Salts," Journal of Pharmaceutical Sciences, 1977, 66(1):1-19.

Bodenner, D.L. et al., (1999) "Essential Requirement of the Estrogen Receptor $\alpha$ or $\beta$ for (Non-Genomic) Anti-Apoptotic Effects of Estrogen," J Bone and Mineral Res, 14(Supp 1)(Abstract F071):S227.

Boh\l, C.E., et al., "Structural Basis for Accommodation of Nonsteroidal Ligands in the Androgen Receptors," J Biol Chem, 280(45): 37747-37754 (Nov. 11, 2005).

Bohl et al., "Structural basis for antagonism and resistance of bicalutamide in prostate cancer," PNAS, 2005, vol. 102, No. 17, 6201-6206.

Bonnick, S. L., et al., (2001) "Importance of Precision in Bone Density Measurements," J. Clin. Densitometry 4(2):105-110.

Bonnick, S., et al., (2006) "Comparison of Weekly Treatment of Postmenopausal Osteoporosis with Alendronate Versus Risedronate Over Two Years," J. Clin. Endocrinol. Metab. 91(7):2631-2637.

Bostrom, M.P.G. et al., (2000) "Parathyroid Hormone-Related Protein Analog RS-66271 is an Effective Therapy for Impaired Bone Healing in Rabbits on Corticosteroid Therapy," Bone, 26(5):437-442.

Browne, "Isotope Effect: Implications for Pharmaceutical Investigations," Stable Isotopes in Pharmaceutical Research, 1997, vol. 26, Chapter 2, pp. 13-18.

Burr, D. B., et al., (2001) "Intermittently Administered Human Parathyroid Hormone(1-34) Treatment Increases Intracortical Bone Turnover and Porosity Without Reducing Bone Strength in the Humerus of Ovariectomized Cynomolgus Monkeys," J. Bone Min. Res. 16(1):157-165.

Caira, Mino R., Crystalline Polymorphism of Organic Compounds, Topics in Current Chemistry vol. 198, 1998, pp. 163-208, Springer Verlag, Berlin DE.

Cantin et al., "Structural Characterization of the Human Androgen Receptor Ligand-biding Domain Complexed with EM5744, a Rationally Designed Steroidal Ligand Bearing a Bulky Chain Directed toward Helix 12," The Journal of Biological Chemistry, 2007, vol. 282, No. 42, pp. 30910-30919.

Cesnjaj et al., "In Vivo Models in the Study of Osteopenias," Eur. J. Clin Chem. Clin Biochem., 1991, vol. 29, pp. 211-219.

(56) References Cited

OTHER PUBLICATIONS

Chantasingh, D., et al., (2006) "Cloning, Expression, and Characterization of a Xylanase 10 from Aspergillus Terreus (BCC129) in Pichia Pastoris," Protein Expre Purif, 46(1):143-149 (Abstract Only).
Chinese Patent Office, Chinese Patent Search Report for 201110220104.X dated Feb. 26, 2013.
Chinese Patent Office, Chinese Patent Search Report for 201280030749X dated Feb. 16, 2015.
Chou, T.C., et al., (1984) "Quantitative Analysis of Dose-Effect Relationships: The Combined Effects of Multiple Drugs or Enzyme Inhibitors," Adv. Enzyme Regul. 22:27-55.
Clinical trials.gov, "A Study for the Transdermal Application of Teriparatide," Retrieved from: http://www.clinicaltrials.gov/ct2/show/NCT01011556?term=pth+patch&rank=8, Date Retrieved: Sep. 18, 2012, 6 pages.
Clinical trials.gov, "Dose Ranging Study—Macroflux PTH in Postmenopausal Women With Osteoporosis," Retrieved from: http://www.clinicaltrials.gov/ct2/show/NCT00489918?term=pth+patch&rank=1, Date Retrieved: Sep. 18, 2012, 1 page.
Cosman, F., (2008) "Parathyroid Hormone Treatment for Osteoporosis," Curr. Opin. Endocrinol. Diabetes Obes. 15:495-501.
Cosman, F., et al., (2009) "Effect of Transdermal Teriparatide Administration on Bone Mineral Density in Postmenopausal Women," J Clin Endocrinol Metab, 95(1): 151-158 (published online Oct. 26, 2009).
Culler, M.D. et al., (2001) "BIM-44058, a Novel Analog of PTHrP with Enhanced Bone Building Activity, but Decreased Calcium-Mobilization Potential," Twenty-Third Annual Meeting of the American Society of Bone and Mineral Research, Phoenix, Arizona, USA, Oct. 12-16, 2001, J Bone Miner Res, (Abstract M460), 16(Suppl. 1):S540.
Culler, M.D. et al., (2002) "A Novel PTHRP Analog with Decreased Calcium-Mobilization Potential, but with Enhanced Bone Building Activity," S19, Abstract for the World Congress on Osteoporosis meeting held on May 10-14, 2002, Lisbon, Portugal (Abstract P51SU), Osteoporos Int 13(1) (Apr. 2002).
Daddona, Peter E., et al., (2011) "Parathyroid Hormone (1-34)-Coated Microneedle Patch System: Clinical Pharmacokinetics and Pharmacodynamics for Treatment of Osteoporosis," Pharm Res, 28:159-165 (published online Jun. 22, 2010).
Dean, T., et al., (2006) "Mechanisms of Ligand Binding to the Parathyroid Hormone (PTH)/PTH-Related Protein Receptor: Selectivity of a Modified PTH(1-15) Radioligand for Gαs-Coupled Receptor Conformations," Mol. Endocrinol. 20(4):931-943.
Dean, T., et al., (2008) "Altered Selectivity of Parathyroid Hormone (PTH) and PTH-Related Protein (PTHrP) for Distinct Conformations of the PTH/PTHrP Receptor", Molecular Endocrinology, 22(1):156-166.
Dempster, D. W., et al., (2012) "Skeletal Histomorphometry in Subjects on Teriparatide or Zoledronic Acid Therapy (SHOTZ) Study: A Randomized Controlled Trial," J. Clin. Endocrinol. Metab. 97(8):2799-2808.
Dempster, D.W. et al., (1993) "Anabolic Actions of Parathyroid Hormone on Bone," Endocr Rev, 14(6):690-709.
Dempster, D.W. et al., (2001) "Effects of Daily Treatment with Parathyroid Hormone on Bone Microarchitecture and Turnover in Patients with Osteoporosis: A Paired Biopsy Study," J Bone Miner Res, 16:1846-1853.
Deschamps, P., et al., (2005) "The Saga of Copper(II)-L-histidine," Coordination Chem Reviews, 249:895-909.
Dhainaut, A., et al., (2013) "Cortical Hand Bone Porosity and Its Association with Distal Radius Fracture in Middle Aged and Elderly Women," PLoS One 8(7):e68405.
Dong, J.Z. et al., (1998) "Development of Highly Potent Human Parathyroid Hormone Analogs," Peptides: Biology and Chemistry, Proceedings of the Chinese Peptide Symposium, 4th, Chengdu, Peop. Rep. China, Jul. 21-25, 1996, pp. 173-175.
Dong, J.Z. et al., (1999) "Highly Potent Human Parathyroid Hormone Analogs," Peptides: Frontiers of Peptide Science, Proceedings of the American Peptide Symposium, 15th, Nashville, Jun. 14-19, 1997, pp. 541-542.
Dong, J.Z. et al., (2001) "Highly Potent Analogs of Human Parathyroid Hormone and Human Parathyroid Hormone-Related Protein," Peptides: The Wave of the Future, Proceedings of the Second International and the Seventeenth American Peptide Symposium, San Diego, CA USA, Jun. 9-14, 2001, pp. 668-669.
Doyle, N., et al., (2013) "BA058, A Novel Human PTHrP Analog: Reverses Overiectomy-Induced Bone Lloss and Strength at the Lumbar Spine in Aged Cynomolgus Monkeys," J. Bone Miner. Res. 28(Suppl 1) Abstract.
Doyle, N., et al., (2013) "Long Term Effect of BA058, a Novel Human PTHrP Analog, Restores Bone Mass in the Aged Osteopenic Ovariectomized Cynomolgus Monkey," J. Bone Miner. Res. 28(Suppl 1):Abstract.
European Patent Office, Extended Search Report and Written Opinion for PCT/US2011/023768 (EP11740437, WO2011097496) complted Apr. 22, 2013 and mailed Apr. 26, 2013.
European Patent Office, Extended Search Report and Written Opinion for PCT/US2011/036311 (EP11781299, WO2011036311) complted Aug. 5, 2013 and mailed Aug. 13, 2014.
European Patent Office, Extended Search Report for PCT/US2011/023768 (EP11740437, W02011097496) mailed Apr. 26, 2013.
European Patent Office, International Search Report and Written Opinion completed Sep. 17, 2008 and mailed Jun. 4, 2009 for PCT/US2007/021216.
European Patent Office, International Search Report and Written Opinion completed Jul. 27, 2009 and mailed Aug. 3, 2009 for PCT/US2009/002868.
European Patent Office, International Search Report and Written Opinion completed Aug. 14, 2009 and mailed Sep. 10, 2010 for PCT/US2009/002885.
European Patent Office, International Search Report and Written Opinion completed Dec. 19, 2011 and mailed Jan. 16, 2012 for PCT/US2011/053375.
European Patent Office, International Search Report and Written Opinion for PCT/US2009/001035 mailed Aug. 7, 2009.
European Patent Office, International Search Report for EP15176548 completed Sep. 30, 2015 and mailed Oct. 7, 2015.
European Patent Office, International Search Report for PCT/EP1996/01962 mailed Sep. 16, 1996.
European Patent Office, International Search Report for PCT/US1997/22498 mailed Dec. 23, 1998.
European Pharmacopoeia 5.0 (EP), Chapter 5.1.3 "Efficacy of Antimicrobial Preservation," 447-4493; 2005.
Everhart-Caye, M. et al., (1996) "Parathyroid Hormone (PTH)-Related Protein(1-36) is Equipotent to PTH(1-34) in Humans," J Clin Endocrinol Metab, 81(1):199-208.
FDA Guidance for Industry (2003) "Q1A(R2) Stability Testing of New Drug Substances and Products."
FDA, Full Prescribing Information for Forteo (teriparatide) injection (2002).
Ferrandon, S., et al., "Sustained cyclic AMP production by parathyroid hormone receptor endocytosis", Nature Chemical Biology, 5(10):734-742 (Oct. 2009).
Fox, J., (2002) "Developments in Parathyroid Hormone and Related Peptides as Bone-Formation Agents," Curr Opin Pharmacology, 2:338-344.
Fraher, L.J. et al., (1992) "A Comparison of the in Vivo Biochemical Responses to Exogenous Parathyroid Hormone-(1-34) [PTH-(1-34)] and PTH-Related Peptide-(1-34) in Man," J Clin Endocrinol Metab, 75(2):417-423.
Fraher, L.J. et al., (1995) "Comparison of the Pharmacokinetics of Parenteral Parathyroid Hormone-(1-34) [PTH-(1-34)] and PTH-Related Peptide-(1-34) in Healthy Young Humans," J Clin Endocrinol Metab, 80(1):60-64 (1995).
Frolik, C.A. et al., (1999) "Comparison of Recombinant Human PTH(1-34) (LY333334) with a C-Terminally Substituted Analog of Human PTH-Related Protein (1-34) (RS-66271): In Vitro Activity and In Vivo Pharmacological Effects in Rats," J Bone Miner Res, 14(2):163-172.

(56) References Cited

OTHER PUBLICATIONS

Frolik, C.A. et al., (2000) "Reply: Further Data are Required to Assure that the Discrepant Binding Affinity is Explained by Different Receptor Conformations," J Bone Miner Res, 15(3):608.
Gallagher, J.C. et al., (1999) "PTHrP(1-34) Analog, Semparatide Acetate (RS- 66271), Causes Sustained Increases in Spine in Postmanopausal Osteoporotic Women: Two Randomized Placebo-Controlled Trials," J Bone Mineral Res, 14(Supp 1)(Abstract 1018):S137.
Gallagher, J.C., et al., (2006) "Response Rate of Bone Mineral Density to Teriparatide in Postmenopausal Women with Osteoporosis," Bone 39:1268-1275.
Gao et al., "Expanding the therapeutic use of androgens via selective androgen receptor modulators (SARMs)" Drug Discovery Today, 2007, vol. 12, No. 5/6, pp. 241-248.
Gao, W., et al., "Comparison of the Pharmacological Effects of a Novel Selective Androgen Receptor Modulator, the 5a-Reductase Inhibitor Finasteride, and the Antiandrogen Hydroxyflutamide in Intact Rats: New Approach for Benign Prostate Hyperplasia," Endocrinology, 145(12):5420-5428 (2004).
Gao, W., et al., "Ockham's Razor and Selective Androgen Receptor Modulators (SARMs): Are we Overlooking the Role of 5a-Reductase? ", Molecular Interventions, 7:1013 (2007).
Gao, W., et al., "Selective Androgen Receptor Modulator Treatment Improves Muscle Strength and Body Composition and Prevents Bone Loss in Orchidectomized Rats," Endocrinology, 146(11):4887-4897 (Nov. 2005).
Garland, M.J., et al., (2011) "Microneedle arrays as medical devices for enhanced transdermal drug delivery," Expert Rev Med Devices, 8(4):459-482.
Garner et al., "RAD1901: a novel, orally bioavailable selective estrogen receptor degrader that demonstrates antitumor activity in breast cancer xenograft models," Anti-Cancer Drugs, vol. 26, No. 9, Oct. 31, 2015, 9 pages.
Gill, H.S. and Prausnitz, M.R., (2007) "Coating Formulations for Microneedles," Pharmaceutical Res, 24(7):1369-1380.
Hamann, L.G., et al., "Tandem Optimization of Target Activity and Elimination of Mutagenic Potential in a Potent Series of N-aryl Bicyclic Hydantoin-Based Selective Androgen Receptor Modulators," Bioorganic & Medicinal Chemistry Letters, 17:1860-1864 (2007).
Han, S.L., et al., (2012) "Effect of Teriparatide on Bone Mineral Density and Fracture in Postmenopausal Osteoporosis: Meta-Analysis of Randomized Controlled Trials," Int. J. Clin. Pract. 66(2):199-209.
Hanada et al., "Bone Anabolic Effects of S-40503, a Novel Nonsteroidal Selective Androgen Receptor Modulator (SARM), in Rat Models of Osteoporosis," Biol. Pharm. Bull., 2003, 26(11):1563-1569.
Hansen, S., et al., (2013) "Differing Effects of PTH 1-34, PTH 1-84, and Zoledronic Acid on Bone Microarchitecture and Estimated Strength in Postmenopausal Women with Osteoporosis: An 18-Month Open-Labeled Observational Study Using HR-pQCT," J. Bone Min. Res. 28(4):736-745.
Hattersley, G., et al. "OR31-5: Differential Binding Selectivity of Abaloparatide (BA058) Compared to PTH and PTHrP for PTH Type 1 Receptor Conformations," Endocrine Society's 96th Annual Meeting and Expo, Jun. 21-24, 2014, Chicago, IL.
Hattersley, G., et al., (2013), "SUN-200: BA058, A Novel Human PTHrP Analog, Restores Bone Density and Increases Bone Strength at the Spine and Femur in Osteopenic Rats," Endocr. Soc. 95th Annual Meeting and Expo, San Francisco, CA, Jun. 15-18, 2013.
Henderson, "Estrogen Replacement Therapy for the Prevention and Treatment of Alzheimer's Disease," CNS Drugs, 1997, 8(5):343-351.
Henry, J.G. et al., (1997) "Parathyroid Hormone-Related Protein-(1-36) is Biologically Active When Administered Subcutaneously to Humans," J Clin Endocrinol Metab, 82(3):900-906.
Higuchi et al., "Novel Series of Potent, Nonsteroidal, Selective Androgen Receptor Modulators Based on 7H-[1,4]Oxazino[3,2-g]quinolin-7-ones," J. Med. Chem., 2007, 50, 2486-2496.

Hildebrand, T. et al., (1999) "Direct Three-Dimensional Morphometric Analysis of Human Cancellous Bone: Microstructural Data from Spine, Femur, Iliac Crest, and Calcaneus," J Bone Miner Res, 14(7):1167-1174.
Hirayama, R., editor; "Crystals Production Handbook—Principles and Know-how)", Maruzen Publishing, Jul. 25, 2008, 57-84, and English Translation.
Hoare, S.R.J. and Usdin, T.B., (1999) "Quantitative Cell Membrane-Based Radioligand Binding Assays for Parathyroid Hormone Receptors," J Pharmacol Toxicol, 41:83-90.
Hoare, S.R.J. and Usdin, T.B., (2000) "Letter to the Editor: The Discrepancy Between the Binding Affinity of PTH (1-34) and RS 66271 is Explained by Interaction of the PTH/PTHrP Receptor with G-Protein," J Bone Miner Res, 15(3):605-607.
Hochberg, M. C., et al., (1999) "Larger Increases in Bone Mineral Density During Allendronate Therapy are Associated with a Lower Risk of New Vertebral Fractures in Women with Postmenopausal Osteoporosis," Arthritis & Rheumatism, 42(6):1246-1254.
Holford, N. H., et al., (1981) "Understanding the Dose-Effect Relationship: Clinical Application of Pharmacokinetic-Pharmacodynamic Models," Clin. Parmacokinet. 6:429-453.
Horig, H. and Pullman, W., "From Bench to Clinic and Back: Perspective on the 1st IQPC Translational Research Conference," J Translational Medicine 2(44):1-8 (2004).
Horwitz, M. J., et al., (2010) "Parathyroid Hormone-Related Protein for the Treatment of Postmenopausal Osteoporosis: Defining the Maximal Tolerable Dose," J. Clin. Endocrinol. Metab. 95:1279-1287.
Horwitz, M. J., et al., (2013) "A Comparison of Parathyroid Hormone-Related Protein (1-36) and Parathyroid Hormone (1-34) on Markers of Bone Turnover and Bone Density in Postmenopausal Women: The PrOP Study," J. Bone Min. Res. 28(11):2266-2276.
Horwitz, M.J. et al., (2003) "Direct Comparison of Sustained Infusion of Human Parathyroid Hormone-Related Protein-(1-36) [hPTHrP-(1-36)] Versus hPTH-(1-34) on Serum Calcium, Plasma 1,25-Dihydroxyvitamin D Concentrations, and Fractional Calcium Excretion in Healthy Human Volunteers," J Clin Endocrinol Metab, 88(4):1603-1609.
Horwitz, M.J. et al., (2003) "Short-Term, High-Dose Parathyroid Hormone-Related Protein as a Skeletal Anabolic Agent for the Treatment of Postmenopausal Osteoporosis," J Clin Endocrinol Metab, 88(2):569-575.
Horwitz, M.J. et al., (2005) "Continuous PTH and PTHrP Infusion Causes Suppression of Bone Formation and Discordant Effects on 1,25(OH)2 Vitamin D," J Bone Miner Res, 20(10):1792-1803.
Horwitz, M.J. et al., (2006) "Safety and Tolerability of Subcutaneous PTHrP(1- 36) in Healthy Human Volunteers: a Dose Escalation Study," Osteoporos Int, 17:225-230.
International Union of Pure and Applied Chemistry (1984) "Nomenclature and Symbolism for Amino Acids and Peptides," Pure Appl Chem 56:595-624.
Jeselsohn, R., et al., (2015) "ESRI Mutations as A Mechanism for Acquired Endocrine Resistance in Breast Cancer," Nat. Rev. Clin. Oncol. 12:573-583.
Jorgensen, L., et al., (2009) "Recent trends in stabilising peptides and proteins in pharmaceutical formulation—consideration in the choice of excipients," Expert Opin Drug Delivery, 6(11):1219-1230.
Kalluri, H. and Banga, A. K., "Transdermal Delivery of Proteins," AAPS PharmSciTech, 12(1) 431-441 (published online Mar. 3, 2011).
Kamberi, M., (2005) The effects of sucrose on stability of human brain natriuretic peptide [hBNP(1-32)] and human parathyroid hormone (hPTH(1-34)], J Peptide Res, 66:348-356.
Katikaneni, S., et al., (2010) "Transdermal delivery of ~13 kDa protein—an in vivo comparison of physical enhancement methods", J Drug Targeting, 18(2):141-147.
Keaveny, T.M., et al., (2012) "Femoral Strength in Osteoporotic women Treated With Teriparatide or Alendronate," Bone 50:165-170.
Kemppainen et al., "Distinguishing Androgen Receptor Agonists and Antagonists: Distinct Mechanisms of Activationby Medroxyprogesterone Acetate and Dihydrotestosterone," Molecular Endocrinology, 1999, vol. 13, No. 3, 440-454.

(56) References Cited

OTHER PUBLICATIONS

Kenan, Y., et al., "Comparison of Transdermal and Subcutaneous Teriparatide Pharmacokinetics and Pharmacodynamics of Bone Markers in Postmenopausal Women," Poster Session, Presentation No. FR0376 of the ASBMR 2010 Annual Meeting, (Oct. 15-16, 2010).
Kharkevich, D.A., Pharmacotherapeutic effect as a function of properties . . . ; Pharmacology, Tenth Edition, 2008, pp. 66-67 and English Translation.
Kim et al., "The 4-Para Substituent of S-3-(phenoxy)-2-hydroxy-2-methyl-N(4-nitro-3-trifluoromethyl-pheny 1)-propionamides is a Major Structural Determinant of In Vivo Disposition and Activity of Selective Androgen Receptor Modulators," American Society for Pharmacology and Experimental Therapeutics, 2005, 42 pages.
Kinoyama et al., "(+)-(2R,5S)-4-[4-Cyano-3-(trifluotomethyl)pheny1]-2,5-dimethyl-N46-(trifluoromethyppyridin-3-yl]piperazine-a-carboxamide (YM580) as an Orally Potent and Peripherally Selective Nonsteroidal Androgen Receptor Antagonist," J. Med. Chem., 2006, 49, 716-726.
Korean Intellectual Property Office, International Search Report for PCT/US2006/044921 mailed Mar. 15, 2007.
Kronenberg, H. M., (2006) "PTHrP and Skeletal Development," Ann. N.Y. Acad. Sci. 1068:1-13.
Krstenansky, J.L. et al., (1995) "RS-66271: Molecular Design and in vivo Bone Anabolic Activity," Peptides 1994, Proceedings of the European Peptide Symposium, 23rd, Braga, Port., Sep. 4-10, 1994:133-134.
Lamb, R., et al., (2013) "Cell Cycle Regulators Cyclin D1 and CDk4/6 Have Estrogen Receptor-Dependent Divergent Functions in Breast Cancer Migration and Stem Cell-Like Activity," Cell Cycle 12(15):2384-2394.
Lange, U., et al., (2005) "Increase in Bone Mineral Density of Patients with Rheumatoid Arthritis Treated with Anti-TNF-Alpha Antibody: A Prospective Open-Label Pilot Study," Rheumatol. 44:1546-1548.
Lanter, J.C., et al., (2007) "The Discovery of a Potent Orally Efficacious Indole Androgen Receptor Antagonist Through in vivo Screening," Bioorganic & Medicinal Chem Letters, 17:123-126.
Leder, B. Z., et al., (2013) "Two Years of Denosumab and Teriparatide Administration n Postmenopausal Women with Osteoporosis (The DATA Extension Study): A Randomized Controlled Trial," Lancet 382(9886):50-56.
Legrand, J.J. et al., (2001) "BIM-44058, a Novel PTHrP Analog, Does Not Increase Total Plasma Calcium in Cynomolgus Monkeys at an Effective Pharmacological Dose," Twenty-Third Annual Meeting of the American Society of Bone and Mineral Research, Phoenix, Arizona, USA, Oct. 12-16, 2001, J Bone Miner Res, (Abstract M454) 16 (Suppl. 1):S539.
Legrand, J.J. et al., (2002) "BIM-44058, A Novel PTHrP Analog, Restores BMD by Selectively Increasing Bone Formation in Old Ovariectomized, Osteopenic Cynomolgus Monkeys," S20, Abstract for the World Congress on Osteoporosis meeting held on May 10-14, 2002, Lisbon, Portugal (Abstract P53SA), Osteoporos Int 13(1).
Legrand, J.J., et al., (2003) "Use of Biochemical Markers to Monitor Changes in Bone Turnover in Cynomolgus Monkeys," Biomarkers, 8(1):63-77.
Lloyd, M.E., et al., (1996) "Relation Between Insulin-Like Growth Factor-I Concentrations, Osteoarthritis, Bone Density, and Fractures in the General Population: the Chingford Study," Ann Rheum Dis, 55:870-874.
Loprinzi, C.L., et al., "Management of Hot Flashes in Breast-Cancer Survivors," *The Lancet Oncology*, 2(4):199-204 (Apr. 2001).
Ma et al., "Raloxifene and teriparatide (hPTH 1-34) have complementary effects on the osteopenic skeleton of ovariectomized rats," J Bone Miner Metab, 2005, 23[Suppl]:62-68.
Ma, Y. L., et al., (2011) "Comparative Effects of Teriparatide and Strontium Ranelate in the Periosteum of Iliac Crest Biopsies in Postmenopausal Women with Osteoporosis," Bone 48:972-978.
Ma, Y.L., et al., (2014) Effects of Teriparatide on Cortical Histomorphometric Variables in Postmenopausal Women With or Without Prior Alendronate Treatment. Bone 59:139-147.
MacLean, C., et al., (2008) "Systematic Review: Comparative Effectiveness of Treatments to Prevent Fractures n Men and Women with Low Bone Density or Osteoporosis," Ann. Intern. Med. 148:197-213.
Mannstadt, M. et al., (1999) "Receptors for PTH and PTHrP: Their Biological Importance and Functional Properties," American Physiological Society: Invited Review:F665-F675.
Manolagas, S.C. et al., (1999) "Opposite Effects of Estrogen on the Life Span of Osteoblasts/Osteocytes Versus Osteoclasts In Vitro: An Explanation of the Imbalance between Formation and Resorption in Estrogen Deficiency," J Bone Mineral Res, 14(Supp 1)(Abstract 1147):S169.
Manolagas, S.C., (1999) "Activators of Non-Genomic Estrogen-Like Signalling (ANGELS): a Novel Class of Small Molecules with Bone Anabolic Properties," J Bone Mineral Res, 14(Supp 1)(Abstract 1191):S180.
Marino, M. et al., "Estrogen Signaling Multiple Pathways to Impact Gene Transcription," Current Genomics, 2006, 7, 497-508.
Martin, T.J., (2005) "Osteoblast-derived PTHrP is a Physiological Regulator of Bone Formation," J Clin Invest, 115(9):2322-2324.
Martinborough et al., "Substituted 6-(1-Pyrrolidine)quinolin-2(1H)-ones as Novel Selective Androgen Receptor Modulators," Journal of Medicinal Chemistry, 2007, vol. 50, No. 21, 5049-5052.
McGinley et al., "Circumventing Anti-Androgen Resistance by Molecular Design," J. Am. Chem. Soc., 2007, 129, 3822-3823.
Medi, B.M. and Singh, J., (2003) "Electronically Facilitated Transdermal Delivery of Human Parathyroid Hormone (1-34)," International J Pharmaceutics, 263:25-33.
Mesu, J. G., et al., (2005) "Infrared and Raman Spectroscopic Study of pH-induced Structural Changes of L-histidine in Aqueous Environment," Vibrational Spectroscopy, 39:114-125.
Miao, D., et al., (2004) "Skeletal Abnormalities in Pth-Null Mice are Influenced by Dietary Calcium," Endocrinology 145:2046-2053.
Miao, D., et al., (2005) "Osteoblast-derived PTHrP is a Potent Endogenous Bone Anabolic Agent that Modifies the Therapeutic Efficacy of Administered PTH 1-34," J Clin Invest, 115(9):2402-2411.
Miller et al., "Synthesis of potent, substitute carbazoles as selective androgen receptor modulators (SARMs)" Bioorganic & Medicinal Chemistry Letters, 2010, 20, 7516-7520.
Miller, C.P., et al., "Design, Synthesis, and Preclinical Characterization of the Selective Androgen Receptor Modulator (SARM) RAD140," ACS Med Chem Lett, 2(2):124-129, DOI: 10.1021/m11002508 (Dec. 2, 2010).
Miller, P. D., et al., (2005) "Monthyl Oral Ibandronate Therapy in Postmenopausal Osteoporosis: 1-Year Results from the MOBILE Study," J. Bone Min. Res. 20(8):1315-1322.
Mitchell, H.J., et al., Design, Synthesis, and Biological Evaluation of 16-Substituted 4-Azasteroids as Tissue-Selective Androgen Receptor Modulators (SARMs), J Med Chem, 52(15):4578-81 (2009).
Mohler, M.L., et al., "Nonsteroidal Selective Androgen Receptor Modulators (SARMs): Dissociating the Anabolic and Androgenic Activities of the Androgen Receptor for Therapeutic Benefit," J Med Chem, 52(12):3597-617 (Jun. 25, 2009).
Morris, J.J., et al., (1991) "Non-steroidal Antiandrogens. Design of Novel Compounds Based on an Infrared Study of the Dominant Conformation and Hydrogen-Bonding Properties of a Series of Anilide Antiandrogens," J Med Chem, 34:447-455.
Moser, C.L., and Meyer, B.K., (2011) "Comparison of Compendial Antimicrobial Effectiveness Tests: A Review," AAPS PharmaSciTech, 12:222-226.
Murrills, R.J. et al., (2004) "In vitro and in vivo Activities of C-Terminally Tuncated PTH Peptides Reveal a Disconnect Between cAMP Signaling and Functional Activity," Bone, 35:1263-1272.
Narayanan, R., et al., (2008) "Selective Androgen Receptor Modulators in Preclinical and Clinical Development," Nuclear Receptor Signaling, 6:e010.

(56) References Cited

OTHER PUBLICATIONS

Neer, R.M. et al., (2001) "Effect of Parathyroid Hormone (1-34) on Fractures and Bone Mineral Density in Postmenopausal Women with Osteoporosis," N Engl J Med, 344(19):1434-1441.
Ng et al., "Synthesis and SAR of potent and selective androgen receptor antagonist: 5,6-Dichloro-benzimidazole derivatives," Bioorganic & Medicinal Chemistry Letters 17, 2007, 17, 784-788.
Ng, R.A., "Synthesis of Potent and Tissue-Selective Androgen Receptor Modulators (SARMs): 2-(2,2,2)-Trifluoroethyl-benzimidazole Scaffold," Bioorganic & Medicinal Chemistry Letters, 17:1784-1787 (2007).
Nishiyama, K. K., et al., (2014) "Teriparatide Increases Strength of the Peripheral Skeleton in Premenopausal Women with Idiopathic Osteoporosis: A Pilot HR-pQCT Study," J. Clin. Endocronol. Metab. 99:2418-2425.
O'Dea, L.S., et al., "BA058, a Novel Analog of Human Parathyroid Hormone-Related Peptide (PTHrP), Induces Evidence of Bone Formation without Evidence of Bone Resorption over 7 Days of Exposure," The Endocrine Society's 89th Annual Meeting held on Jun. 2-5, 2007, (Abstract) P2-137:361 (published on May 11, 2007).
Obaidi, M., et al., (2010) "Pharmacokinetics and Pharmacodynamic of Subcutaneously (SC) Administered Doses of BA058, A Bone Mass Density Restoring Agent in Healthy Postmenopausal Women," AAPS(abstract): W5385.
Odgaard, A. and Gundersen, H.J.G., (1993) "Quantification of Connectivity in Cancellous Bone, with Special Emphasis on 3-D Reconstructions," Bone,14:173-182.
Odgaard, A., (1997) "Three-Dimensional Methods for Quantification of Cancellous Bone Arhitecture," Bone, 20(4):315-328.
Oei, L., et al. (2013) "High Bone Mineral Density and Fracture Risk in Type 2 Diabetes as Skeletal Complications of Inadequate Glucose Control," Diabetes Care 36:1619-1628.
Okazaki, M., et al., (2008) "Prolonged signaling at the parathyroid hormone receptor by peptide ligands targeted to a specific receptor conformation," PNAS, 105(43):16525-16530.
Ornoy et al., "Osteoporosis: Animal Models for the Human Disease," Animal Models of Human Related Calcium Metabolic Disorders, 1995, Chapter 5, 105-126.
Ostrowski et al., "Pharmacological and X-Ray Structural Characterization of a Novel Selective Androgen Receptor Modulator: Potent Hyperanabolic Stimulation of Skeletal Muscle with Hypostimulation of Prostate in Rats," Endocrinology, 2007, 148(1):4-12.
Pandya, K.J., et al., "Pilot Study Using Gabapentin for Tamoxifen-Induced Hot Flashes in Women with Breast Cancer," *Breast Cancer Research and Treatment*, 83:87-89 (2004).
Papapoulos, S. E., (2011) "Use of Biophosphonates in the management of postmenopausal osteoporosis," Ann. N.Y. Acad. Sci. 1218:15-32.
Patel, R.M., (2010) "Parenteral Suspension: An Overview," Int J Curr Pharm Res, 2(3):4-13.
Patsch, J. M., et al., (2013) "Increased Cortical Porosity in Type-2 Diabetic Postmenopausal Women with Fragility Fractures," J. Bone Miner. Res. 28(2):313-324.
Paudel, K.S., et al., (2010) "Challenges and opportunities in dermal/transdermal delivery," Ther Deliv, 1(1):109-131.
PCT/US2007/014598 "Notification Concerning Transmittal of International Preliminary Report on Patentability (Chapter I of the Patent Cooperation Treaty)" from International Application No. PCT/US2007/014598 dated Jan. 15, 2009.
Pellegrini, M. et al., (1997) "Conformational Studies of RS-66271, an Analog of Parathyroid Hormone-Related Protein with Pronounced Bone Anabolic Activity," J Med Chem, 40(19):3025-3031.
Pellegrini, M. et al., (1998) "Addressing the Tertiary Structure of Human Parathyroid Hormone-(1-34)," J Biol Chem, 273(17):10420-10427.
Pellegrini, M. et al., (1999) "RS-66271, a Clinical Candidate Derived from Parathyroid Hormone Related Protein: the Role of Enhanced Amphiphilic Helicity," Peptides: Frontiers of Peptide Science, Proceedings of the American Peptide Symposium, 15th, Nashville, Jun. 14-19, 1997, 392-393.
Perumal, O., et al., (2013) "Turning Theory into Practice: The Development of Modern Transdermal Drug Delivery systems and Future Trends," Skin Pharmacol Physiol, 26:331-342.
Pioszak, A. A., et al., (2009) "Structural Basis for Parathyroid Hormone-Related Protein Binding to the Parathyroid Hormone Receptor and Design of Conformation-Selective Peptides," J. Biol. Chem. 284(41):28382-28391.
Piu et al., "Pharmacological characterization of AC-262536, a novel selective androgen receptor modulator," Journal of Steroid Biochemistry & Molecular Biology, 2008, 109, 129-137.
Plotkin, H. et al., (1998) "Dissociation of Bone Formation from Resorption during 2-Week Treatment with Human Parathyroid Hormone-Related Peptide-(1-36) in Humans: Potential as an Anabolic Therapy for Osteoporosis," J Clin Endocrinol Metab, 83(8):2786-2791.
Recker, R. R., et al., (2009) "Comparative Effects of Teriparatide and Strontium Ranelate on Bone Biopsies and Biochemical Markers of Bone Turnover in Postmenopausal Women with Osteoporosis," J. Bone Min. Res. 24(8):1358-1368.
Riedmaier et al., "Influence of testosterone and a novel SARM on gene expression in whole blood of *Alacaca fascicularis*," Journal of Steroid Biochemistry and Molecular Biology, 2009, 114, 167-173.
Rochira, V., et al., (2006) "Osteoporosis and Male Age-Related Hypogonadism: Role of Sex Steroids on Bone (patho)Physiology," Eur J Endocrinol, 154:175-185.
Roe, E.B. et al., (1999) "Parathyroid Hormone 1-34 (hPTH 1-34) and Estrogen Produce Dramatic Bone Density Increases in Postmenopausal Osteoporosis—Results from a Placebo-Controlled Randomized Trial," J Bone and Mineral Res, 14(Supp 1)(Abstract 1019):S137.
Rogol, A. D., "Causes of Short Stature," UptoDate, pp. 1-15, accessed May 2, 2016 at http://www.uptodate.com/contents/causes-of-short-stature?topicKey=PEDS%2F5832&elaps . . . .
Rosen, C.J., (2005) "Clinical Practice. Postmenopausal Osteoporosis," N. Engl. J. Med. 353(6):595-603.
Rosenblatt, M., (2009) "When Two Keys Fit One Lock, Surprises Follow", Nature Chem. Biol. 5(10):707-708.
Salvatii et al., "Identification and optimization of a novel series of [2.2.1]-oxabicyclo imide-based androgen receptor antagonist," Bioorganic & Medicinal Chemistry Letters, 2008, 1910-1915.
Schafer et al., "Failure is an option learning from unsuccessful proof-of-concept trials," Drug Discovery Today, 2008, vol. 13, No. 21/22, 913-916.
Sebba, A. I., (2008) "Significance of a Decline in Bone Mineral Density While Receiving Oral Biphosphonate Treatment," Clin. Ther. 30(3):443-452.
Sebba, A. I., et al., (2004) "Response to Therapy with Once-Weekly Alendronate 70 mg Compared to Once-Weekly Risedronate 35 mg in the Treatment of Postmenopausal Osteoporosis," Curr. Med. Res. Opin. 20(12):2031-2041.
Sharon Laboratories data Sheet "Parabens.".
Silva, B. C., et al., (2014) "Trabecular Bone Score: A Noninvasive Analytical Method Based Upon the DXA Image," J. Bone Min. Res. 29(3):518-530.
Silverman, S.L., et al., (2008) "Recommendations for the Clinical Evaluation of Agents for Treatment of Osteoporosis: Conscensus of an Expert Panel Representing the American Society for Bone and Mineral Research (ASBMR), the International Society for Clinical Densitometry (ISCD), and the National Osteoporosis Foundation (NOF)," J. Bone Miner. Res. 23(1):159-165.
Singapore Intellectual Property Office, Search Report and Written Opinion for 2013078324 completed Jul. 15, 2015.
Singapore Intellectual Property Office, Written Opinion for 2013078324 completed Mar. 5, 2016.
Smith, S. Y., et al., (2013) "Eldecalcitol, a Vitamin D Analog, Reduces Bone Turnover and Increases Tabecular and Cortical Bone Mass, Density, and Strength in Ovariectomized Cynomolgus Monkeys," Bone 57:116-122.
Stearns, V., et al., "A Pilot Trial Assessing the Efficacy of Paroxetine Hydrochloride (Paxil) in Controlling Hot Flashes in Breast Cancer Survivors," *Annals of Oncology*, 11:17-22 (2000).

(56) References Cited

OTHER PUBLICATIONS

Stellman, J.T., (2009) "Development, Production and Characterization of Plastic Hypodermic Needles," MS Thesis, Georgia Institute of Technology, pp. 1-150.
Storage Conditions—Peptides International, pepnet.com/ShoppingUsers/StorageStability.aspx; Aug. 20, 2012.
Sundar et al., "Spironolactone, a possible selective androgen receptor modulator, should be used with caution in patients with metastatic carcinoma of the prostate," BJM Case Rep, 2012, Abstract.
Suzuki, Y., et al., (2001) "Iontophoretic Pulsatile Transdermal Delivery of Human Parathyroid Hormone (1-34)," J Pharmacy and Pharmacology, 53(9):1227-1234.
Thiel, "Structure-aided drug design's next generation," Nature Biotechnology, 2004, vol. 22, No. 5, 513-519.
Toniolo, C., (1993) "Cα,α-Symmetrically Disubstituted Glycines: Useful Building Blocks in the Design of Conformationally Restricted Peptides", Janssen Chim. Acta, 11:10-16.
Tsai, J.N., et al., (2013) "Comparative Effects of Teriparatide, Denosumab, and Combination Therapy on Peripheral Compartmental Bone Density, Microarchitecture: the DATA-HRpQCT Study," Annual Meeting of the American Society of Bone and Mineral Research, Baltimore, MD.
Tsai, J.N., et al., (2015) "Comparative Effects of Teriparatide, Denosumab, and Combination Therapy on Peripheral Compartmental Bone Density, Microarchitecture, and Estimated Strength: the DATA-HRpQCT Study," J. Bone Miner. Res. 30(1):39-45.
Tucker, H., et al., (1988) "Nonsterodial Antiandrogens, Synthesis and Structure- Activity Relationships of 3-Substituted Derivatives of 2-Hydroxypropionanilides," J Med Chem, 31:954-959.
U.S. Department of Health and Human Services, Bone Health and Oseoporosis: A Report of the Surgeon General, Rockville, MD (2004).
United States Patent and Trademark Office, International Preliminary Report on Patentability (Ch I) for PCT/US2010/030480 issued Oct. 11, 2011.
United States Patent and Trademark Office, International Preliminary Report on Patentability (Ch I) for PCT/US2011/023768 issued Aug. 7, 2012.
United States Patent and Trademark Office, International Preliminary Report on Patentability (Ch I) for PCT/US2012/034510 issued Mar. 18, 2014.
United States Patent and Trademark Office, International Search Report and Written Opinion for PCT/US16/20787 mailed Jul. 22, 2016.
United States Patent and Trademark Office, International Search Report and Written Opinion for PCT/US2012/34510 completed Aug. 11, 2012 and mailed Aug. 31, 2012.
United States Patent and Trademark Office, International Search Report and Written Opinion for PCT/US17/26462 completed Jun. 6, 2017 and mailed Jul. 3, 2017.
United States Patent and Trademark Office, International Search Report and Written Opinion for PCT/US2009/054348 mailed Dec. 9, 2009.
Unnanumtana, A., et al., (2010) "Current Concepts Review: The Assessment of Fracture Risk," J. Bone Joint Surg. Am. 92:743-753.
Vajda et al., "Pharmacokinetics and Pharmacodynamics of LGD-3303 [9-Chloro-2-ethyl-1-methyl-3-(2,2,2-trifluoroethyl)-3H-pyrrolo-[3,2-f]quinolin-7(6H)-one], an Orally Available Nonsteroidal-Selective Androgen Receptor Modulator," The Journal of Pharmacology and Experimental Therapeutics, 2009, vol. 328, No. 2, 663670.
Van Der Maaden, K., et al., (2012) "Microneedle technologies for (trans)dermal drug and vaccine delivery", J Controlled Release, 161:645-655.
Van Oeveren et al., "Novel selective androgen receptor modulators: SAR studies on 6-bisalkylamino-2-quinolinones," Bioorganic & Medicinal Chemistry Letters, 2007, 17:1527-1531.
Vikery, B.H. et al., (1996) "RS-66271, a C-Terminally Substituted Analog of Human Parathyroid Hormone-Related Protein (1-34), Increases Trabecular and Cortical Bone in Ovariectomized, Osteopenic Rats," J Bone Miner Res, 11(12):1943-1951.
Wermuth, C. G. editor; "The Practice of Medicinal Chemistry", book two of two, 347-365, Kabushiki Kaisha Technomics, 1999, and English Translation.
Wright, P., "Transdermal Drug Delivery Looks for New Frontiers," Pharmaceutical Commerce, Feb. 26, 2013.
Yates, J. et al., (2014) "OR22-4: A Transdermal Patch Delivering the PTHrP1-34 Analog, Abaloparatide (BA058), Dose-Dependently Increases Spine and hip BMD Compared to Placebo," Endocrine Society's 96th Annual Meeting and Expo, Chicago, IL Jun. 21-24, 2014.
Zeng, C., et al., "Efficient Synthesis of (2R,3S)-2-amino-3-(benzyloxy)-4,4,4-trifluorobutanoic acid (4,4,4-trifluoro-OBn-D-allothreonine)," Tetrahedron Letters, 51:53615363 (2010).
Zhang et al., "Synthesis and SAR of novel hydantoin derivatives as selective androgen receptor modulators," Bioorganic & Medicinal Chemistry Letters, 2006, vol. 16, Issue 22, 5763-5766.
Zhang, X., et al., "Design, Synthesis, and in Vivo SAR of a Novel Series of Pyrazolines as Potent Selective Androgen Receptor Modulators," J Med Chem, 50(16):3857-3869 (2007).
Zhang, Y., et al., (2009) "Inhibition of Peptide Acylation in PLGA Microspheres with Water-Soluble Divalent Cationic Salts," Pharm. Res. 26(8):1986-1994.
Zizic, T.M., et al., (2004) "Pharmacologic Prevention of Osteoporotic Fractures," Am Fam Physician, 70:1293-1300.
China 202080011109.9 Search Report dated Aug. 1, 2023.
European 20710682.4 Search Report dated Mar. 20, 2024.
Russia 2021124020 Search Report dated Jul. 11, 2023.
Singapore 11202108479U Search Report and Written Opinion dated Nov. 22, 2022.
Barraja, P., et al., Indolo[3,2-c]cinnolines with Antiproliferative, Antifungal, and Antibacterial Activity, Bioorganic & Medicinal Chemistry, vol. 7, pp. 1591-1596, Elsevier Science Ltd. 1999.
Das, S., et al., Zinc(II)-Catalyzed Chemoselecitve Reduction of Amides to Amines, J. Am. Chem. Soc., vol. 132, 1770-1771, Thieme Stuttgart, 2010.

* cited by examiner

PROCESSES AND COMPOUNDS

CROSS-REFERENCE TO RELATED APPLICATIONS

This application is a National Stage Application and claims priority under 35 U.S.C. § 371 to Patent Cooperation Treaty application PCT/US2020/017777, filed Feb. 11, 2020, which claims the benefit of and priority under 35 U.S.C. § 119(e) to U.S. Provisional Application 62/804,391, filed Feb. 12, 2019. Priority is claimed to both of these applications and the disclosures of these prior applications are considered part of the disclosure of this application, and to the extent allowed, the entire contents of the aforementioned applications are incorporated herein.

FIELD OF THE INVENTION

Useful processes of preparation and intermediates useful for the preparation of Compound 1, a selective estrogen receptor alpha (ERα) modulator/degrader (SERM/SERD), having utility for the treatment of ER+ cancers including breast cancer are described.

BACKGROUND

Breast cancer is the second leading cause of cancer-related death in women, with an estimated 246,660 newly diagnosed cases and 40,450 deaths in the United States alone in 2016. Breast cancer is a heterogeneous disease divided into three subtypes based on expression of three receptors: estrogen receptor (ER), progesterone receptor (PR), and human epidermal growth factor receptor-2 (Her2). Overexpression of ERs is found in many breast cancer patients. ER-positive (ER+) breast cancers comprise two-thirds of all breast cancers. Other than breast cancer, estrogen and ERs are associated with, for example, ovarian cancer, colon cancer, prostate cancer and endometrial cancer.

Compound 1 has demonstrated promising mixed activity as a selective estrogen receptor alpha (ERα) modulator/degrader (SERM/SERD) against ER+ breast cancer, acting as a SERM at low doses and a SERD at high doses. In response to the growing demand for Compound 1, more efficient syntheses are required to provide increased quantities of Compound 1 to be used in additional clinical studies and potential future commercial use.

SUMMARY OF THE INVENTION

In certain embodiments, compounds (a)-(g) are useful in the preparation of a selective estrogen receptor modulator/degrader as disclosed herein.

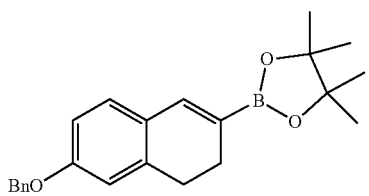
(a)

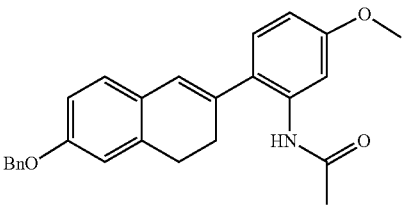
(b)

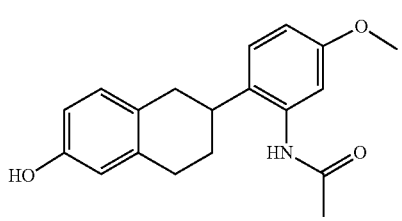
(c)

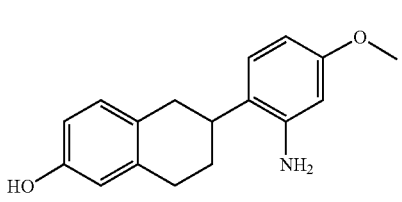
(d)

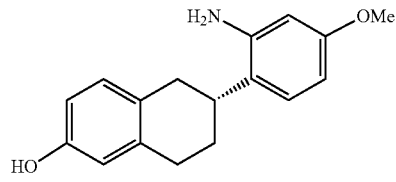
(e)

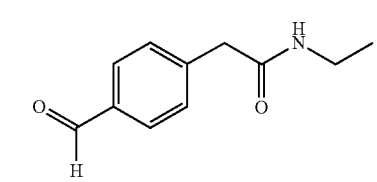
(f)

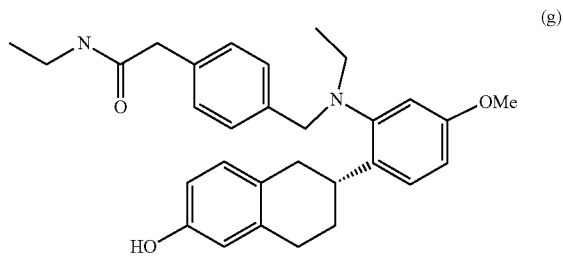
(g)

In certain aspects, the compounds of formula (e) and (g) are present with an enantiomeric excess >50%, 60%, 70%, 80%, 90%, 95%, 98%, 99%. In some embodiments, the compound having formula (e) or (g) is present in an enantiomeric excess of >50%.

In several embodiments, processes useful in the preparation of intermediates and in the preparation of Compound 1 are provided.

Compound 1

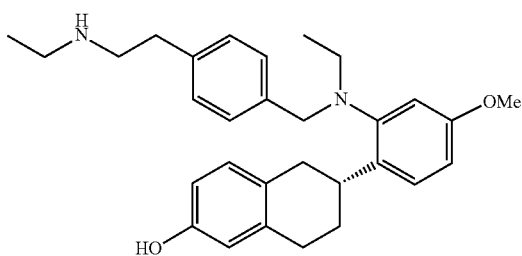

In one embodiment, a process for the preparation of a compound of formula (III) is provided:

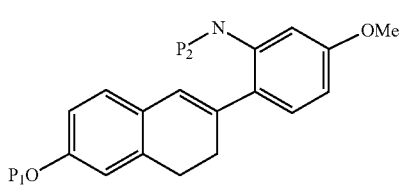

comprising the reaction of a compound of formula (I):

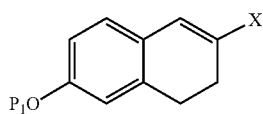

with a compound of formula (II):

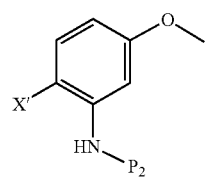

in the presence of a base and a transition metal catalyst; wherein $P_1$ is H or a phenol protecting group, $P_2$ is H, Et or an amino-protecting group, X is a halogen, transition metal or boron-containing compound and X' is a halogen, transition metal-containing function or boron-containing function wherein said X and X' are suitable for cross-coupling of compound (I) with compound (II).

In some embodiments of the process for the preparation of the compound of formula (III), $P_1$ is H, (C=O)—$C_1$-$C_8$ alkyl, (C=O)-aryl, (C=O)-heteroaryl, Si($C_1$-$C_5$ alkyl)$_3$, Si(aryl)$_2$($C_1$-$C_5$ alkyl) or CH$_2$Aryl; $P_2$ is H, Et, or an amino protecting group selected from (C=O)—$C_1$-$C_8$ alkyl, (C=O)-aryl, (C=O)-heteroaryl, (C=O)—O—$C_1$-$C_8$ alkyl, (C=O)—O-aryl, (C=O)—O-heteroaryl, (C=O)—O—$C_1$-$C_8$ alkylaryl and (C=O—(CH$_2$)$_n$—C=O)—; X is B(OR)$_2$, B(—O—(C($R_a$)$_2$)$_n$—O—), Cl, Br, I, OSO$_2$CF$_3$ or OSO$_2$(aryl); X' is B(OR)$_2$, B(—O—(C($R_a$)$_2$)$_n$—O—), Cl, Br, I, OSO$_2$CF$_3$ or OSO$_2$(aryl); each R is independently H, $C_{1-3}$ alkyl or aryl; each $R_a$ is independently $C_{1-3}$ alkyl or aryl; and each n is independently an integer of 2 or 3, wherein when X is B(OR)$_2$ or B(—O—(C($R_a$)$_2$)$_n$—O—); X' is Cl, Br, I, OSO$_2$CF$_3$ or OSO$_2$(aryl).

In related embodiments of the process for the preparation of the compound of formula (III), $P_1$ is H, (C=O)—$C_1$-$C_8$ alkyl, (C=O)-aryl or CH$_2$Aryl; $P_2$ is H, Et, or an amino protecting group selected from (C=O)—$C_1$-$C_8$ alkyl, (C=O)-aryl or (C=O)—O—$C_1$-$C_8$ alkylaryl; X is B(OR)$_2$ and B(—O—(C($R_a$)$_2$)$_n$—O—); X' is Cl, Br, I or OSO$_2$CF$_3$; R is independently H, $C_{1-3}$ alkyl or aryl; each $R_a$ is independently $C_{1-3}$ alkyl or aryl; and n is an integer of 2 or 3.

In some embodiments of the process for the preparation of the compound of formula (III), $P_1$ is H, (C=O)—$C_1$-$C_8$ alkyl or CH$_2$Aryl; $P_2$ is H, Et, or an amino protecting group selected from (C=O)—$C_1$-$C_8$ alkyl, (C=O)-aryl and (C=O)—O—$C_1$-$C_8$ alkyl; X is B(OR)$_2$ or B(—O—(C($R_a$)$_2$)$_n$—O—); X' is Cl, Br, I or OSO$_2$CF$_3$; R is H, $R_a$ is CH$_3$, and n=2.

In certain embodiments for the process for the preparation of the compound of formula (III), the process is conducted in the presence of a transition metal catalyst, said transition metal catalyst containing Pd (II), Cu (0) or Pd (0), or any combinations thereof.

In related embodiments for the process of preparation of the compound of formula (III) said transition metal catalyst is selected from the group consisting of Pd(OAc)$_2$, Pd(PPh$_3$)$_4$, PdCl$_2$(PPh$_3$)$_2$, Pd(dppf)Cl$_2$, Pd$_2$(Dba)$_3$, Cu(0) and Pd(PCy$_3$)$_2$, and any combinations thereof.

In some embodiments for the process of preparation of the compound of formula (III), said process is conducted in the presence of an inorganic or organic base, or any combinations thereof.

In some embodiments for the process of preparation of the compound of formula (III), said process is conducted in the presence of an inorganic base. In some further embodiments the inorganic base is selected from NaOH, KOH, Na$_2$CO$_3$, K$_2$CO$_3$, Cs$_2$CO$_3$, NaHCO$_3$, KHCO$_3$, and CsHCO$_3$. In a further embodiment, the inorganic base is KHCO$_3$.

In some embodiments, the compounds of formula (I), (II) and (III) have the structures (a), (aa') and (b).

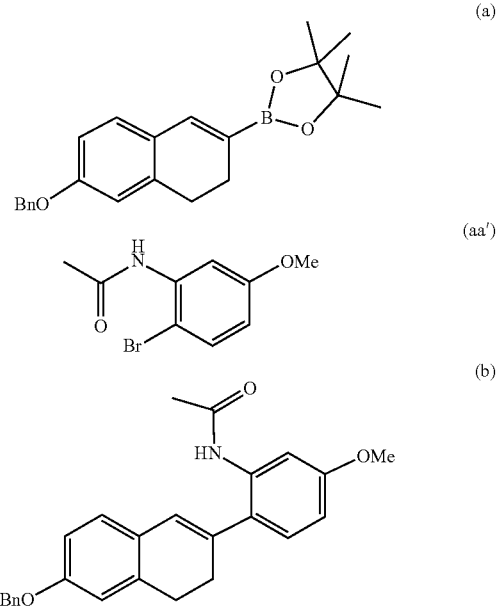

In some aspects, a process of preparing a compound of formula (IV) is described:

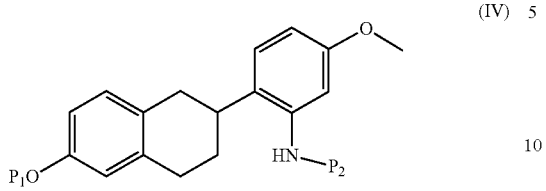
(IV)

comprising the reduction of a compound of formula (III):

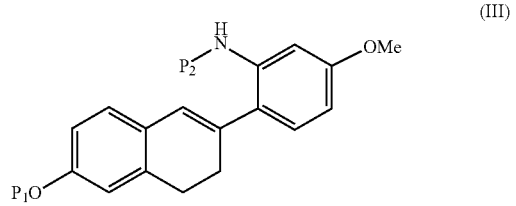
(III)

in the presence of a reducing agent, wherein:

P₁ is a H or a phenol protecting group and P₂ is H, Et or an amino-protecting group.

In some embodiments, the process of preparing a compound of formula (IV) is described wherein the reducing agent is H₂ in the presence of a transition metal catalyst.

In certain embodiments, the process of preparing a compound of formula (IV) is described wherein the transition metal catalyst contains Pd(II).

In some embodiments, the process of preparing a compound of formula (IV) is described wherein the transition metal catalyst is Pd(OH)₂.

In some embodiments, the process of preparing a compound of formula (IV) is described wherein P₁ is H, (C=O)—C₁-C₈ alkyl, (C=O)-aryl, (C=O)-heteroaryl, Si(C₁-C₅ alkyl)₃, Si(aryl)₂(C₁-C₅ alkyl) or CH₂Aryl and P₂ is H, Et, or an amino protecting group selected from (C=O)—C₁-C₈ alkyl, (C=O)-aryl, (C=O)-heteroaryl, (C=O)—O—C₁-C₈ alkyl, (C=O)—O-aryl, (C=O)—O-heteroaryl, (C=O)—O—C₁-C₈ alkylaryl and —(C=O—(CH₂)ₙ—C=O).

In certain embodiments, the process of preparing a compound of formula (IV) is described wherein P₁ is H, (C=O)—C₁-C₈ alkyl or CH₂Aryl; P₂ is Et, or an amino protecting group selected from (C=O)—C₁-C₈ alkyl, (C=O)-aryl and (C=O)—O—C₁-C₈ alkyl.

In certain embodiments, the process of preparing a compound of formula (IV) is described wherein P₁ is CH₂Ph and P₂ is (C=O)—CH₃.

In certain embodiments, the process of preparing a compound of formula (IV) is described wherein P₁ is H and P₂ is (C=O)—CH₃.

In some aspects, a process of preparing a compound of formula (V) is provided:

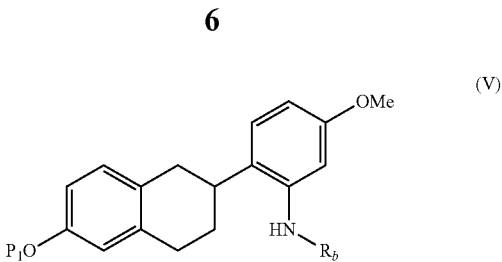
(V)

comprising the reaction of a compound of formula (IV):

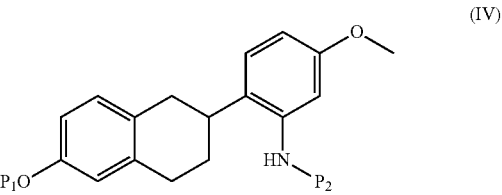
(IV)

with an acid, base, nucleophile or reducing agent wherein:
P₁ is H or a phenol protecting group, P₂ is an amino-protecting group and R_b is H or Et.

In certain aspects, the process of preparing a compound of formula (V) is described wherein P₂ is (C=O)—CH₃ and R_b is Et and wherein the compound of formula (IV) is treated with a hydride-containing reducing agent. In some embodiments, the reducing agent is an inorganic reducing agent. In some embodiments the reducing agent is an inorganic hydride-containing reducing agent. In some further embodiments, the reducing agent contains boron or aluminum. In yet further embodiments, the reducing agent is a boron or aluminum hydride containing sodium, lithium or potassium. In some embodiments, the reducing agent is AlH₃, AlH₂Cl, AlHCl₂, NaBH₄, LiAlH₄, LiBH₄, LiEt₃BH, BH₃, BH₃·THF, CH₃CH₂C(O)OBH₃Na, Zn(OAc)₂/(EtO)₃SiH, Mg/TiCL₄, (HBpin)/tris(4,4-dimethyl-2-oxazolinyl)phenylborateMgMe, or combinations thereof.

In some aspects, a process of preparing a compound of formula (V) is provided:

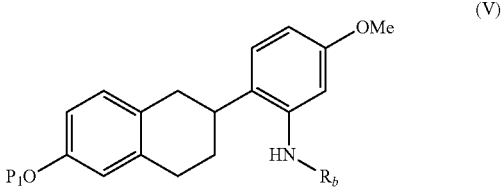
(V)

comprising the reaction of a compound of formula (IV):

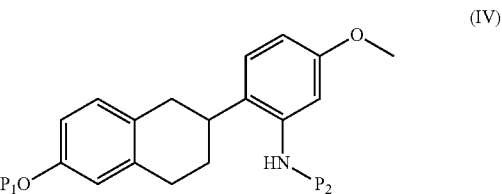
(IV)

with an acid, base, nucleophile or reducing agent wherein:
P₁ is H or a phenol protecting group, P₂ is (C=O)—CH₃ and R_b is H or Et.

In certain aspects, the process of preparing a compound of formula (V) is described wherein $P_2$ is (C=O)—$CH_3$ and $R_b$ is Et and wherein the compound of formula (IV) is treated with a hydride-containing reducing agent. In some embodiments, the reducing agent is an inorganic reducing agent. In some embodiments the reducing agent is an inorganic hydride-containing reducing agent. In some further embodiments, the reducing agent contains boron or aluminum. In yet further embodiments, the reducing agent is a boron or aluminum hydride containing sodium, lithium or potassium. In some embodiments, the reducing agent is $AlH_3$, $AlH_2Cl$, $AlHCl_2$, $NaBH_4$, $LiAlH_4$, $LiBH_4$, $LiEt_3BH$, $BH_3$, $BH_3 \cdot THF$, $CH_3CH_2C(O)OBH_3Na$, $Zn(OAc)_2/(EtO)_3SiH$, $Mg/TiCL_4$, (HBpin)/tris(4,4-dimethyl-2-oxazolinyl)phenylborateMgMe, or combinations thereof.

In certain aspects, the process of preparing a compound of formula (V) is described wherein $P_2$ is (C=O)—$CH_3$ and $R_b$ is H and wherein the compound of formula (IV) is treated with acid, in some embodiments, the acid is hydrochloric acid or another protic acid.

In certain aspects, the process of preparing a compound of formula (V) is described wherein the compound according to formula (IV) is treated with an acid, base or nucleophile, and $R_b$ is H.

In certain aspects, the process of preparing a compound of formula (V) is described wherein the compound according to claim (IV) is treated with an acid or base, in some embodiments said acid or base is in an aqueous solution.

In some embodiments, $P_2$ is (C=O)—$C_1$-$C_8$ alkyl, (C=O)-aryl, (C=O)-heteroaryl, (C=O)—O—$C_1$-$C_8$ alkyl, (C=O)—O-aryl, (C=O)—O-heteroaryl, (C=O)—O—$C_1$-$C_8$ alkylaryl or (C=O—($CH_2$)$_n$—C=O). In some embodiments, $P_2$ is (C=O)—$CH_3$.

In some embodiments, $P_1$ is H, (C=O)—$C_1$-$C_8$ alkyl, (C=O)-aryl, (C=O)-heteroaryl, Si($C_1$-$C_5$ alkyl)$_3$, Si(aryl)$_2$ ($C_1$-$C_5$ alkyl) or $CH_2$Aryl. In some embodiments, $P_1$ is H or —$CH_2$—$C_6H_5$.

In yet other aspects, a process for increasing the enantiomeric excess of a compound of formula (VI) is described:

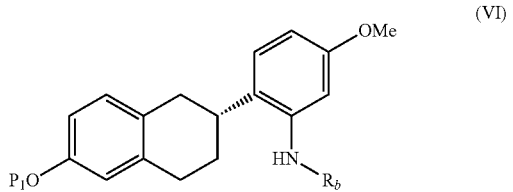

(VI)

comprising the formation of a diastereomeric acid addition of the mixture (V):

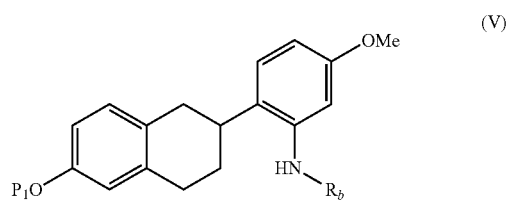

(V)

and selectively crystallizing the diastereomeric salt enhanced with the enantiomer of formula (VI) and subsequently freeing the base wherein $P_1$ is H or a phenol protecting group and $R_b$ is H or Et. In some embodiments, the enantiomeric excess is >10%, >50%, >75%, >90%, >95%, >98% or >99%.

In another aspect, a process for increasing the enantiomer excess of a compound of formula (VI) is described:

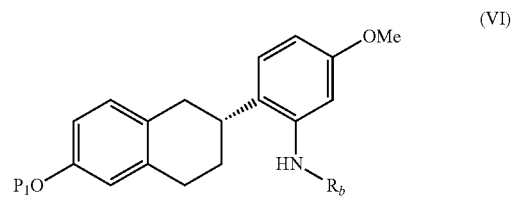

(VI)

comprising contacting a compound of formula (V) with a chiral acid to form an enantiomerically enriched salt,

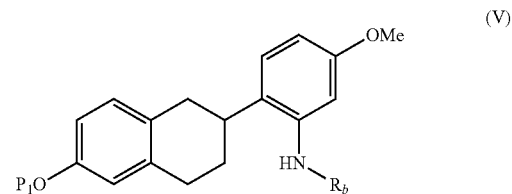

(V)

crystallizing the enantiomerically enriched salt, and freeing the compound of formula (VI), wherein $P_1$ is H or a phenol protecting group; and $R_b$ is H or Et.

In some aspects, the process of enhancing the enantiomeric excess of a compound of formula (VI) utilizes a (+) or (−) chiral acid selected from Aspartic acid, O-Acetyl-Mandelic acid, cis-2-Benzamidocyclohexanecarboxylic acid, 1,1'-Binapthyl-2,2'-diyl hydrogen phosphate, Camphoric acid, 10-Camphorsulfonic acid, trans-1,2-Cyclohexanedicarboxylic acid, Dibenzoyl-Tartaric acid, Diacetyl-tartaric acid, Di-p-toluoyl-tartaric acid, N-(3,5-Dinitrobenzoyl)-α-phenylglycine, Diacetyl-tartaric anhydride, Diacetyl-tartaric acid, Glutamic acid, Malic acid, Mandelic acid, N-(α-methylbenzyl)phthalamic acid, 2-(6-Methoxy-2-napthyl) propionic acid, Pyroglutamic acid, Quinic acid and Tartaric acid, or combinations thereof. In some embodiments the acid is (+)-2,3-Dibenzoyl-D-tartaric acid.

In some embodiments, for the process of enhancing the enantiomeric excess of a compound of formula (VI); $P_1$ is H, (C=O)—$C_1$-$C_8$ alkyl, (C=O)-aryl, (C=O)-heteroaryl, Si($C_1$-$C_5$ alkyl)$_3$, Si(aryl)$_2$($C_1$-$C_5$ alkyl) or $CH_2$Aryl. In certain embodiments, $P_1$ is H, (C=O)—$C_1$-$C_8$ alkyl or $CH_2$Aryl. In some embodiments, $P_1$ is —$CH_2$Ph or H. In some further embodiments, $P_1$ is H. In some embodiments, $P_1$ is H and $P_2$ is H.

In certain embodiments, a process of preparing a compound of formula (VII) is described:

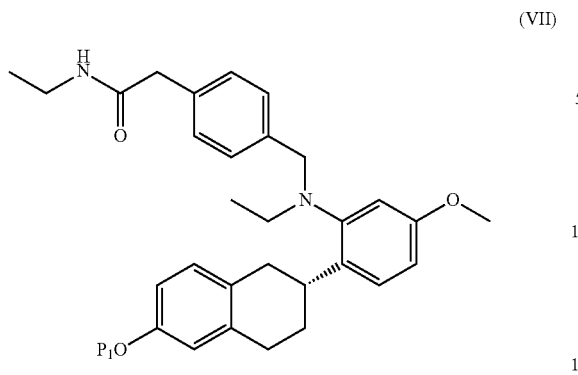

wherein $P_1$ is H or a phenol protecting group; comprising the reaction of a compound of formula (f):

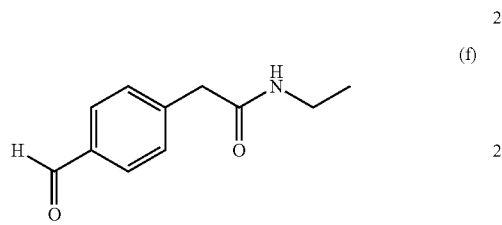

with a compound of formula (VI):

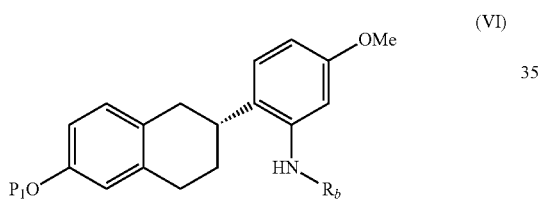

in the presence of a reducing agent wherein $P_1$ is H or a phenol protecting group and $R_b$ is H or Et. In some embodiments, $P_1$ is H and $R_b$ is H.

In some embodiments wherein $R_b$ is H, said reducing agent is $NaBH_n(OAc)_{n'}$; wherein n is an integer from 1-3, n' is an integer from 1-3, and n+n'=4. In some embodiments, $NaBH_n(OAc)_{n'}$ is $NaBH(OAc)_3$.

In certain embodiments, $R_b$ is Et and said reducing is an inorganic hydride-containing reducing agent. In some embodiments, said inorganic hydride-containing reducing agent contains boron or aluminum. In further embodiments, said reducing agent is a boron or aluminum hydride containing sodium, lithium or potassium. In some embodiments said reducing agent is $AlH_3$, $AlH_2Cl$, $AlHCl_2$, $NaBH_4$, $LiAlH_4$, $LiBH_4$, $LiEt_3BH$, $BH_3$, $BH_3 \cdot THF$, $CH_3CH_2C(O)OBH_3Na$, $Zn(OAc)_2/(EtO)_3SiH$, $Mg/TiCL_4$, (HBpin)/tris(4,4-dimethyl-2-oxazolinyl)phenylborateMgMe, or combinations thereof.

In some embodiments of the process of preparing a compound of formula (VII), $P_1$ is H.

In some embodiments of formula (VIII), $P_1$ is H, and the compound of formula (VIII) is Compound 1.

In certain embodiments, a process of preparing a compound of formula (VIII) is described:

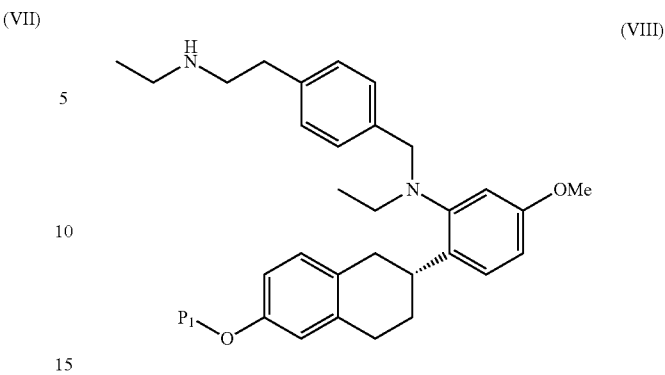

comprising the reduction of a compound of formula (VII):

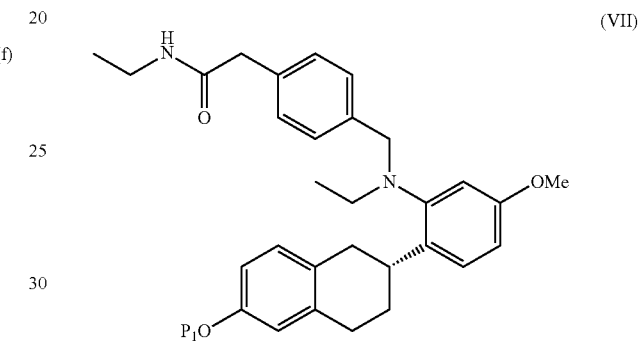

wherein $P_1$ is H or a phenol protecting group.

In certain embodiments of the process, the reduction is done in the presence of $AlH_3$, $AlH_2Cl$, $AlHCl_2$, $NaBH_4$, $LiAlH_4$, $LiBH_4$, $LiEt_3BH$, $BH_3$, $BH_3 \cdot THF$, $CH_3CH_2C(O)OBH_3Na$, $Zn(OAc)_2/(EtO)_3SiH$, $Mg/TiCL_4$,(HBpin)/tris(4,4-dimethyl-2-oxazolinyl)phenylborateMgMe or combinations thereof, and in some embodiments, the process is conducted in the presence of in situ generated $BH_3$ and in some embodiments, the reaction is conducted in the presence of $NaBH_4/I_2$.

In some embodiments, a process of preparing a compound of formula (VIII) is described:

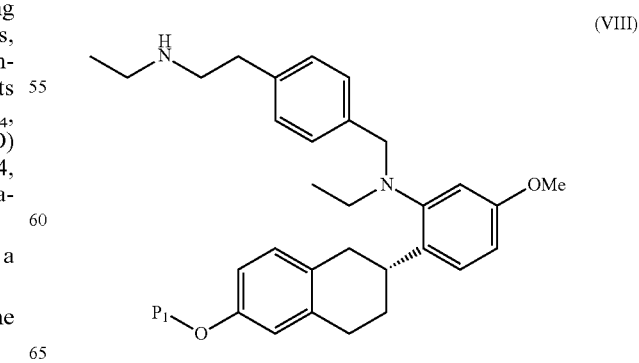

comprising the reduction of a compound of formula (VII);

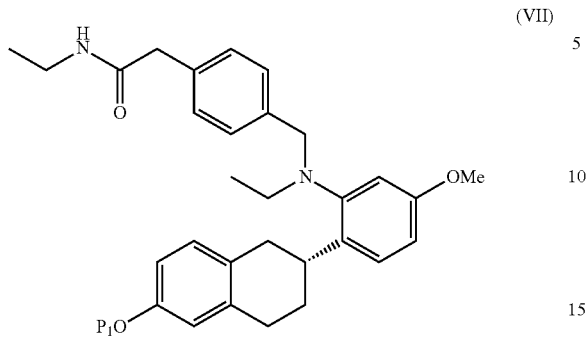
(VII)

wherein $P_1$ is H, or a phenol protecting group; and wherein said compound of formula (VII) is prepared by a reductive amination of a compound of formula (VI);

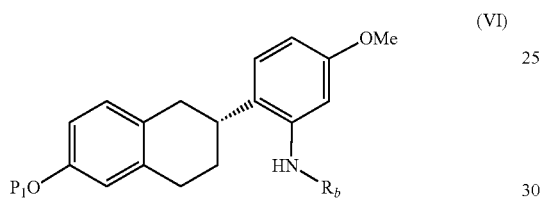
(VI)

wherein $R_b$ is Et or H and $P_1$ is hydrogen or a phenol protecting group; in the presence of a compound of formula (f);

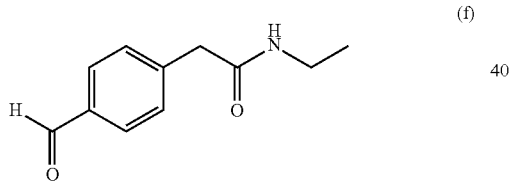
(f)

wherein said compound of formula (VI) is prepared by crystallization of a diastereomeric acid addition salt of a mixture having the formula (V) wherein $R_b$ is Et or H and $P_1$ is hydrogen or a phenol protecting group;

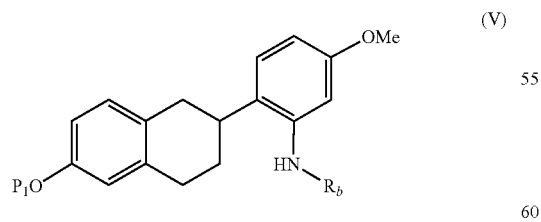
(V)

wherein said compound of formula (V) is prepared by treatment of a compound of formula (IV) with acid, base or a nucleophile when $P_2$ is (C=O)—$C_1$-$C_8$ alkyl, (C=O)-aryl, (C=O)-heteroaryl, (C=O)—O—$C_1$-$C_8$ alkyl, (C=O)—O-aryl, (C=O)—O-heteroaryl, (C=O)—O—$C_1$-$C_8$ alkylaryl or —(C=O—($CH_2$)$_n$—C=O), or optionally a reducing agent when $P_2$ is (C=O)—$CH_3$ and wherein $P_1$ is hydrogen or a phenol protecting group;

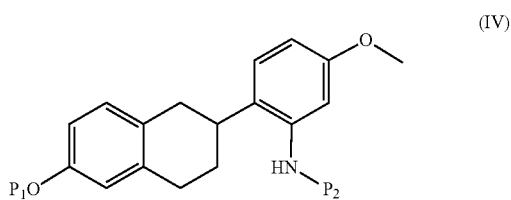
(IV)

wherein said compound of formula (IV) is prepared by reduction of a compound of formula (III) wherein $P_1$ is H or a phenol protecting group and $P_2$ is H, Et, or an amino protecting group selected from (C=O)—$C_1$-$C_8$ alkyl, (C=O)-aryl, (C=O)-heteroaryl, (C=O)—O—$C_1$-$C_8$ alkyl, (C=O)—O-aryl, (C=O)—O-heteroaryl, (C=O)—O—$C_1$-$C_8$ alkylaryl and (C=O—($CH_2$)$_n$—C=O);

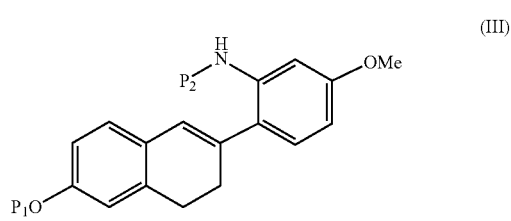
(III)

wherein said compound of formula (III) is prepared by the coupling of a compound of formula (I) wherein $P_1$ is H or a phenol protecting group, and X is a halogen, transition metal or boron-containing compound;

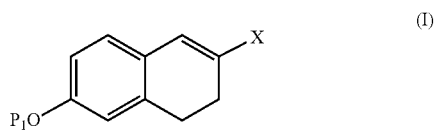
(I)

with a compound of formula (II) wherein X' is a halogen, transition metal-containing function or boron-containing function and $P_2$ is H, Et or an amino-protecting group:

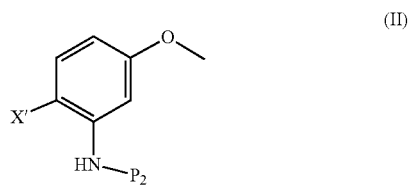
(II)

and wherein said X and X' are suitable for cross-coupling of compound (I) with compound (II).

In one aspect, a process of preparing a compound of formula (VIII) is described,

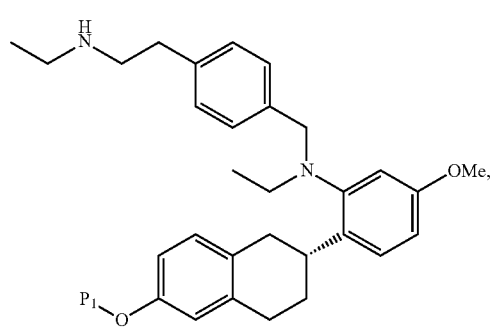

(VIII)

comprising the reduction of a compound of formula (VII)

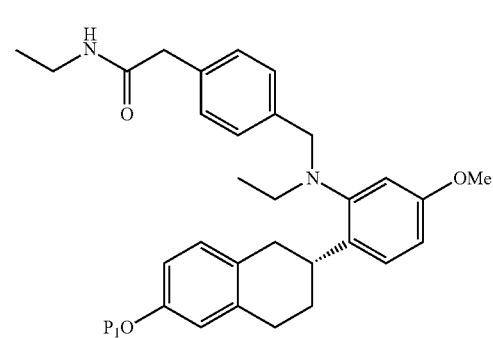

(VII)

wherein said compound of formula (VII) is prepared by a reductive amination of a compound of formula (VI)

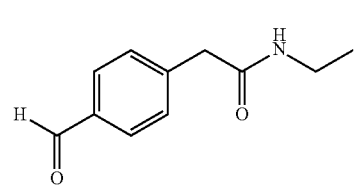

(VI)

in the presence of a compound of formula (f)

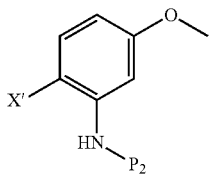

(f)

wherein said compound of formula (VI) is prepared by contacting a compound of formula (V)

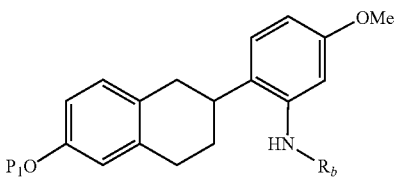

(V)

with a chiral acid to form an enantiomerically enriched salt, crystallizing the enantiomerically enriched salt, and freeing the compound of formula (VI), wherein said compound of formula (V) is prepared by treatment of a compound of formula (IV) with a reducing agent;

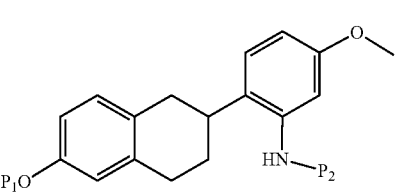

(IV)

wherein said compound of formula (IV) is prepared by reduction of a compound of formula (III)

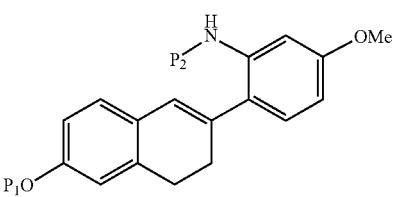

(III)

wherein said compound of formula (III) is prepared by the coupling of a compound of formula (I)

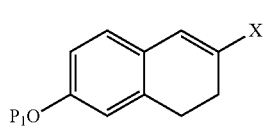

(I)

with a compound of formula (II)

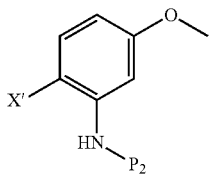

(II)

and wherein $P_1$ is H, or a phenol protecting group; $R_b$ is H or Et; $P_2$ is (C=O)—CH$_3$; X is a halogen, transition metal or boron-containing compound; and X' is a halogen, transition metal-containing function or boron-containing function; and wherein said X and X' are suitable for cross-coupling of compound (I) with compound (II).

In some embodiments of the process of preparing a compound of formula (VII), $P_1$ is H. In some embodiments of formula (VIII), $P_1$ is H, and the compound of formula (VIII) is Compound 1.

DETAILED DESCRIPTION OF THE INVENTION

Compound 1 has demonstrated promising mixed activity as a selective estrogen receptor alpha (ERα) modulator/degrader (SERM/SERD) against breast cancer, acting as a SERM at low doses and a SERD at high doses.

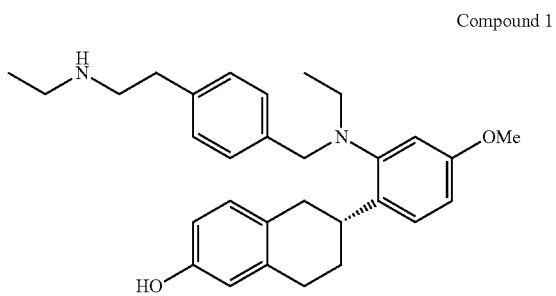 [SMILES: CCNCCc1ccc(CN(CC)c2cc(OC)ccc2[C@@H]2CCc3cc(O)ccc3C2)cc1]

Compound 1

Due to the interest in further development of Compound 1, larger quantities derived from innovative and efficient syntheses are needed for both preclinical and clinical studies with the eventual hope that the compound will be approved for commercial use, after which even much larger amounts will need to be produced. Accordingly, new and more efficient syntheses are needed. The present disclosure provides new and unexpectedly improved syntheses over the prior art disclosures (see e.g., U.S. Pat. No. 7,612,114).

The present disclosure provides both general procedures as well as specific examples demonstrating the efficacy of the described procedures.

As used herein, the terms below have the following definitions unless stated otherwise.

"Compound 1" or "RAD1901" has the following structure:

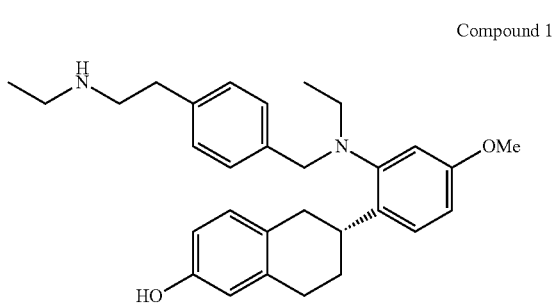 [SMILES: CCNCCc1ccc(CN(CC)c2cc(OC)ccc2[C@@H]2CCc3cc(O)ccc3C2)cc1]

Compound 1 including salts, solvates (e.g. hydrate), and prodrugs thereof. In some embodiments, the pharmaceutically acceptable salt of Compound 1 is "Compound 1 dihydrochloride" or "Compound 1 bis hydrochloride (.2HCl) salt" having the following structure:

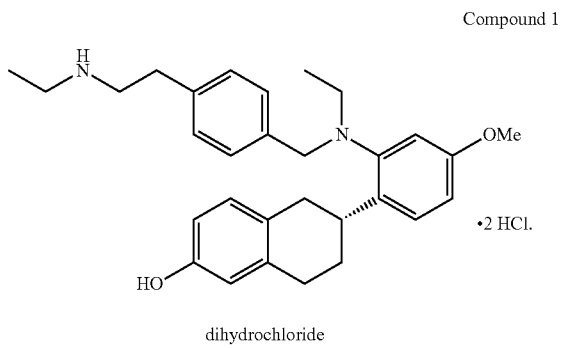 [SMILES: CCNCCc1ccc(CN(CC)c2cc(OC)ccc2[C@@H]2CCc3cc(O)ccc3C2)cc1]

Compound 1 dihydrochloride

A "halogen" atom is a fluorine, chlorine, bromine or iodine.

An "alkyl" group is a linear or branched chain, monovalent saturated hydrocarbon radical optionally substituted with up to five independently selected halogen atoms, hydroxyl groups (—OH), methyl, ethyl or propyl ether groups (—OMe, —OEt, —OPr or —OiPr), cyano groups (—CN) or —NO$_2$ groups. For example, a $C_{1-5}$ alkyl group includes -methyl, -ethyl, -isopropyl, -2-chloro-3-hydroxyl-butyl, -2-fluoro-4-nitro-pentyl, etc.

An "aryl" group is a monovalent aromatic hydrocarbon radical of 6-20 carbon atoms ($C_6$-$C_{20}$). Aryl includes such structures as phenyl, biphenyl, naphthyl, etc. Aryls can be optionally substituted with up to five substituents independently selected from -halogen, —$C_{1-6}$ alkyl ethers, -hydroxyl, —CN, —$C_{1-6}$ alkyl and —NO$_2$.

A "heteroaryl" group is a cyclic aromatic group containing between 4 and 9 carbon atoms and containing between 1 and 3 heteroatoms, such as nitrogen, oxygen or sulfur. Said heteroaryl group may be monocyclic or bicyclic. By way of non-limiting example said heteroaryl includes without limitation oxazole, pyridine, quinoline, pyran, pyrrole and the like. Further, said heteroaryl can be substituted with up to five substituents selected from -halogen, —$C_{1-6}$ alkyl ethers, -hydroxyl, —CN, —$C_{1-6}$ alkyl and —NO$_2$.

Where terms are joined, as in, for example, —$C_1$-$C_8$ alkylaryl, the definitions for the separate functions (e.g., "$C_{1-8}$ alkyl" and "aryl") are each as defined separately including, for example, substitutions and branching. Thus, a $C_{1-8}$ alkylaryl could include an alkyl radical of 1-(3-chloro-nitrobutyl)-3-methylbenzene where the radical point of attachment is on the terminus of the butyl fragment as shown below:

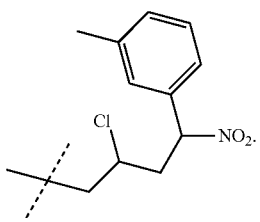

In the processes provided herein, reference is made to protecting groups, such as "a phenol protecting group" or an "amino protecting group". When described accordingly, one of ordinary skill in the art will appreciate that the particular protecting group can be selected from protecting groups known to those of skill in the art and also protecting groups varying from those known to those of skill but understood to be logical extensions of those groups and understood or predicted to operate by the same mechanism and having similar properties to those most closely related to those known in the art. While not wishing to be bound by example, protecting groups useful for the processes outlined herein can be found in various textbooks and hereby incorporated by reference. For example, see *Protective Groups in Organic Synthesis* (Green (Wuts), Wiley Publishing), *Protecting Groups in Organic Synthesis*: (Postgraduate Chemistry Series) (Hanson, Wiley Publishing), *Protecting Groups* (Kocienski, Thieme Publishing).

An example of the processes described here is shown in Scheme 1 and described briefly below. The vinyl bromide exemplified by compound (a') can be converted to its boron derivative (a) (2-(6-(benzyloxy)-3,4-dihydronaphthalen-2-yl)-4,4,5,5-tetramethyl-1,3,2-dioxaborolane) and then coupled with (aa') (N-(2-bromo-5-methoxyphenyl)acetamide) in the presence of base to render the coupled compound (b) (N-(2-(6-(benzyloxy)-3,4-dihydronaphthalen-2-yl)-5-methoxyphenyl)acetamide in an overall yield of >70%. Compound (b) was then reduced with Pd(OH)$_2$/H$_2$ which both reduced the double bond and debenzylated the phenol to render (c) which was subsequently de-acetylated to produce compound (d) with the yield over both steps (b to d) of >90%. Compound (d) is typically a 50:50 racemic mixture and the desired compound has the (R)-stereochemistry at the 6-position. In this regard, it has been discovered that forming the acid addition salt with the appropriate chiral acids (as described herein) followed by crystallizing the product can efficiently increase the enantio-purity of compound (e) and related derivatives. In the present example, a racemic mixture was treated with (+)-2,3-dibenzoyl-D-tartaric acid [(+)-DBTA, 0.5 eq.] and the desired salt crystallized out in >90% ee and >90% of the theoretical yield of the desired enantiomer. The next step is the reductive amination of compound (e) with benzaldehyde (f) wherein the Schiff base is formed first between the aldehyde (f) with the aniline (e), followed by reduction with NaBH(OAc)$_3$ and the yield of crude product >90%. The reaction reduces the Schiff base formed between the amine (e) and benzaldehyde (f) and surprisingly also ethylates the aniline to give the desired tertiary aniline. Not wishing to be bound by theory, it is believed that acetyl transfer and reduction from the NaBH(OAc)$_3$ reagent occurs. The product (g) was reduced with NaBH$_4$/I$_2$ which is believed to generate BH$_3$ in situ followed by a reductive work up with Na$_2$S$_2$O$_3$ and the product purified and treated with HCl (MeOH, EtOH and/or EtOAc) and the yield of the bis HCl salt of Compound 1 was >50%.

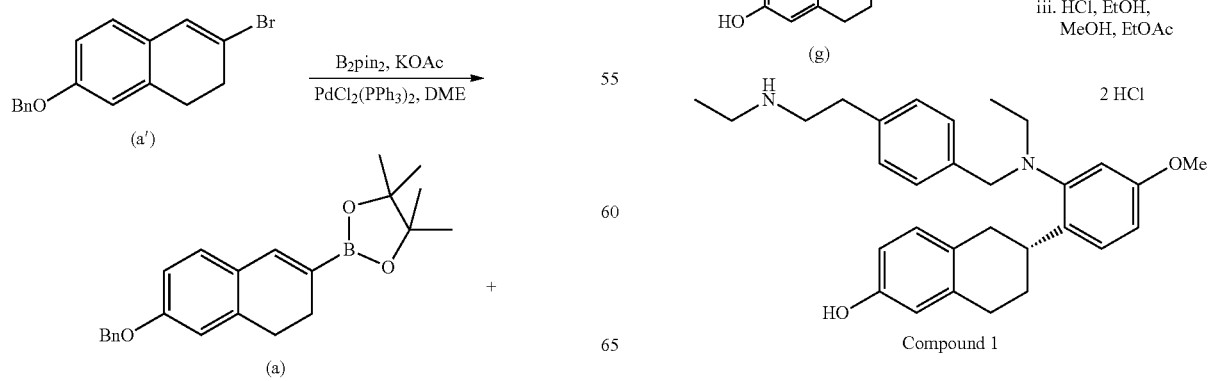

Step 1—Preparation of N-(2-(6-(benzyloxy)-3,4-dihydronaphthalen-2-yl)-5-methoxyphenyl)acetamide (b)

A solution of (a', 1 eq.) and bis(pinacolato)diboron (1.3 eq.) were dissolved in 7 volumes of 1,2-dimethoxyethane (DME), treated with KOAc (3.1 eq.) and $PdCl_2(PPh_3)_2$ (2 mol %), and heated at 85° C. The reaction was then monitored for completion by HPLC. The solution was cooled to 20° C. and treated with 25 wt % $KHCO_3$ (aqueous, 3 volumes) and 2-bromo-5-methoxyacetanilide (aa', 1 eq), then heated to 85° C. and monitored for completion by HPLC. The reaction was then cooled to 55° C. and the mixture filtered and the solids washed with DME. The water layer was separated off and the remaining organic layer cooled to 20° C. and diluted with 6.9 volumes of water. The mixture was then agitated for ≥1 hour and the formed solids filtered and washed with 3.1 volumes of water and the cake dried at ≤55° C. The combined solids were treated with 10 volumes of dichloromethane (DCM) and carbon (0.25 wt equivalents) and the resulting mixture was stirred and heated to reflux (approx. 40° C.) for ≥6 hours. The mixture was then cooled to 20° C., the solid filtered, and washed with 3 volumes of DCM. The resulting filtrate solution was concentrated to 3 volumes under vacuum at ≤45° C. and treated with 6 volumes of ethanol (EtOH) and concentrated under vacuum at ≤45° C. to 4.9 volumes. An additional 6 volumes of EtOH was added and the volume once again concentrated under vacuum at ≤45° C. to 4.9 volumes and 1 volume of EtOH added and cooled to 20° C. and the product collected by filtration and rinsed with 1 volume of EtOH and dried under $N_2$ at ≤50° C. to provide (b) in >70% yield.

Step 2—Preparation of (+/−)N-(2-(6-hydroxy-1,2,3,4-tetrahydronaphthalen-2-yl)-5-methoxyphenyl)acetamide (c)

A solution of (b) (1 eq.), $Pd(OH)_2/C$ (0.1 weight equivalents), THF (7 volumes) and MeOH (7 volumes) was purged with $N_2$ and then $H_2$ at 20° C. The reaction mixture was agitated under 100 psi $H_2$ for ≥12 hours at 20° C. and the reaction monitored for completion. After purging the reaction with $N_2$ at 20° C., the reaction mixture was heated at 40° C. for ≥1 hour, filtered and rinsed with 1.5 volumes of THF and 1.5 volumes of MeOH. The solution was concentrated to 2.4 volumes under vacuum at ≤45° C. and treated with 12 volumes of EtOAc, concentrated to 2.4 volumes under vacuum at ≤45° C., treated again with 12 volumes of EtOAc and concentrated to 2.4 volumes under vacuum at ≤45° C. and treated with 3.3 volumes of EtOAc and the temperature adjusted to 20° C. and agitated at 20° C.≥1 hour, the product collected by filtration and washed with 1.4 volumes of EtOAc. The solid can be recrystallized in MeOH/EtOAc if desired and the product (c) dried at temperatures ≤50° C.

Step 3—Preparation of (+/−)6-(2-amino-4-methoxyphenyl)-5,6,7,8-tetrahydronapthalen-2-ol (d)

A solution of ((c), 1 eq.) in 9 volumes of MeOH and concentrated HCl (1.5 wt equivalents) was heated and agitated at reflux ≥16 hours (approx. 65° C.) and monitored for completion. The reaction was cooled to ≤35° C. and concentrated under vacuum at ≤45° C. to 3.8 volumes, charged with 3 volumes of 2-MeTHF and concentrated under vacuum at ≤45° C. to 3.8 volumes, charged with 3 volumes of 2-MeTHF and concentrated under vacuum at ≤45° C. to 3.8 volumes, charged with 12 volumes of 2-MeTHF then 10 volumes of 1 M NaOH followed by 1.5 weight equivalents of 25% $KHCO_3$ while maintaining the internal temperatures at ≤35° C. The internal temperature was adjusted to 20° C. and stirred for ≥15 minutes. The pH was adjusted/maintained to between 8-10 using 1 M HCl or 1 M NaOH. The agitation was stopped and the aqueous layer separated out after settling and 1 volume of $H_2O$ added and the solution stirred ≥15 minutes and the aqueous layer removed after settling and one additional volume of $H_2O$ added and the aqueous layer separated out after settling. The organic layer was concentrated under vacuum to 3 volumes at ≤45° and the solution treated with 3 volumes of heptane and agitated for 12 hours at 20° C. The solids were collected by filtration and the filter cake rinsed with 2 volumes of heptane. The solvents were evaporated at ≤50° C. to provide the title compound (d) in a yield of >90%.

Step 4—Preparation of Compound (R)-6-(2-amino-4-methoxyphenyl)-5,6,7,8-tetrahydronapthalen-2-ol (e)

One equivalent of (d) in 14.2 volumes of MeCN and 4.8 volumes of DCM was heated to 40° C. To this was added (+)-2,3-dibenzoyl-D-tartaric acid [(+)-DBTA, 0.5 eq.] and heated to reflux (approximately 65° C.). The reactor was cooled to 50° C. for approximately 1 hour, cooled to 40° C. for approximately 1 hour and cooled to 25° C. for approximately 1 hour. The slurry was filtered and the filter cake washed with 2 volumes of DCM. The wet filter cake was refluxed (approximately 44° C.) in 8 volumes of DCM for ≥1 h. The solution was cooled to 25° C. at a rate of 15° C./h and stirred at 25° C. for ≥1 hour. The slurry was filtered and washed with 2 volumes of DCM and the cake was again slurried with 8 volumes of DCM for 1 hour at ambient temperature and then filtered and washed with 2 volumes of DCM and dried. (The chiral purity was assayed at this point, providing an enantiomeric excess of >90%).

A solution containing the (+)-DBTA salt, 15 volumes of water and 3 volumes of methanol was treated with 4.6 volumes of a 25% $KHCO_3$ aqueous solution and agitated at 25° C. for ≥1 h. The solids were collected by filtration and rinsed with 4 volumes of water. The aqueous layer was adjusted to a pH of ≥8 using 25% $KHCO_3$ as needed, and the resulting solids were collected by filtration. The filter cake was washed with 4 volumes of water. The combined solids were added to 4 volumes of water, the resulting slurry was stirred for ≥1 h, and the solids were then collected by filtration. The filter cake was washed with 4 volumes of water and 4 volumes of heptane and was dried at ≤50° C. to provide the title compound (R)-6-(2-amino-4-methoxyphenyl)-5,6,7,8-tetrahydronapthalen-2-ol (e). The yield was determined to be >90% and the ee was determined to be >90%.

Step 5—Preparation of (R)-N-ethyl-3-(4-((ethyl(2-(6-hydroxy-1,2,3,4-tetrahydronapthalen-2-yl)-5-methoxyphenyl)amino)methyl)propanamide (g)

A mixture containing 1 equivalent of compound (e) together with 1 wt equivalent of activated molecular sieves and anhydrous THF was agitated at ambient temperature for ≥2 hours. The mixture was filtered through THF-compacted celite and rinsed with 10 volumes of THF. The solution was charged with N-ethyl-2-(4-formylphenyl)acetamide (f) (1.2 eq.) and 7.5 volumes of heptane and DBTA (0.1%) and heated to reflux (approximately 65° C.). The mixture was atmospherically distilled to 10 volumes at reflux. The reaction was monitored for completion via TLC. 2.9 volumes of heptane and 7.1 volumes of THF were added and the reaction was atmospherically distilled to 10 volumes at reflux and monitored for completion by TLC. The solution was cooled to 20° C. and agitated for ≥5 hours to ensure that crystallization had occurred. The solid product was collected by filtration, rinsed with 2 volumes of heptane and dissolved in 40 volumes of anhydrous THF and treated with 4.5 equivalents of NaBH(OAc)$_3$. The mixture was heated to 50° C. for ≥16 hours and monitored by TLC. An additional 4.5 equivalents of NaBH(OAc)$_3$ was added (additional N-ethyl-2-(4-formylphenyl)acetamide (f) could be added at this point if the reaction was not complete). The reaction was cooled to 20° C. and quenched with 15 volumes of 3 M NaOH. The solution/mixture was agitated for ≥30 minutes and the pH adjusted to 8-9 with 9% aqueous NaHCO$_3$ (approximately 14 volumes) if necessary. The aqueous layer was separated out and the organic layer concentrated to 5 volumes under vacuum at ≤45° C. The resulting solution was diluted with 10 volumes of EtOAc and concentrated to 5 volumes under vacuum at ≤45° C. The solution was treated with 10 volumes of EtOAc and 5 volumes of 5.6% NaCl solution, stirred and then allowed to settle and the aqueous layer removed. The mixture was dried with Na$_2$SO$_4$ (4 wt) and filtered and concentrated to 5 volumes under vacuum at ≤45° C., treated with 10 volumes of heptane and concentrated to 5 volumes under vacuum at ≤45° C., treated with 10 volumes of heptane and concentrated to 5 volumes under vacuum at ≤45° C. and treated with 10 volumes of heptane and concentrated to 5 volumes under vacuum at ≤45° C. The solution was then treated with 10 volumes of THF and dried under vacuum at ≤45° C. and treated again with 10 volumes of THF and dried to 5 volumes under vacuum at ≤45° C. and treated with 5 volumes of THF and residual heptane evaluated by GC (<4%) and the THF solution carried forward to the next reaction. The yield of the final product was determined to be >90%.

Step 6—Preparation of (R)-6-(2-(ethylamino)ethyl) benzyl)amino)-4-methoxyphenyl)-5,6,7,8-tetrahydronaphthalen-2-ol (Compound 1)

A reactor was charged with 7 volumes of THF and 2.5 equivalents of NaBH$_4$ and cooled to from −10° C. to 0° C. The solution was charged with the THF solution carried over from step 6 (1 equivalent of intermediate (g)) while maintaining the reactor temperature at ≤5° C. The solution was stirred with an internal temperature adjusted to −25° C. 1 Equivalent of 12 in 1 volume of THF was added to the solution while maintaining the temperature at ≤−10° C. The mixture was agitated for ≥30 minutes at ≤−10° C. then heated to reflux and stirred at reflux (approximately 66° C.) for at 4 hours and monitored by HPLC for completion. The reaction mixture was cooled to ≤5° C. and quenched with 0.5 volumes of concentrated HCl while maintaining the reaction mixture temperature of ≤−10° C., and then treated with 15 volumes of water. The pH was checked and adjusted to less than 1.5 as needed. The solution was then heated to reflux and atmospherically distilled until the internal temperature reaches 80° C. The reaction mixture was cooled to 15-25° C., stirred for 6 hours and the solid isolated by filtration. The solid was charged back into the reactor along with 10 volumes of EtOAc and 5 volumes of 1 M NaOH and the mixture agitated for up to 30 minutes at 10-20° C. The pH was checked and adjusted to 8-9 as needed. The organic and aqueous layers were allowed to separate and the aqueous layer removed and washed with 10 volumes of EtOAc. The aqueous layer was removed and the combined organic layers were washed with 2×5 volumes of 5% sodium thiosulfate solution. The organic layer was washed with 4×10 volumes of 1% NaCl solution. The aqueous layer was removed and the organic layer concentrated to 3 volumes at an external temperature of up to 45° C. Three times, the residue was dissolved in 10 volumes of EtOH and concentrated to 3 volumes at ≤45° C. The solution was dried with Na$_2$SO$_4$ and filtered and the filtrate charged to a reactor where it was treated with 1 volume of EtOAc and stirred and charged with 3.3 M HCl in EtOH (1.4 volumes) and the mixture agitated at 15-25° C. for ≥2 hours and then concentrated to 4.6 volumes at ≤45° C. The solution was treated with 12.4 volumes of EtOAc and agitated at 15-25° C. for ≥2 hours to ensure that crystallization had occurred. The solids were collected by filtration and rinsed with 3.1 volumes of EtOAc. The filter cake was dried at ≤50° C. The material can be assayed for purity and recrystallized from MeOH/EtOAc if desired. The yield of the final product was >50% and the purity >90%. If desired, the product can be recrystallized from EtOH/EtOAc to generate a polymorphic form having good stability.

I claim:

1. A process of preparing a compound of formula (VIII)

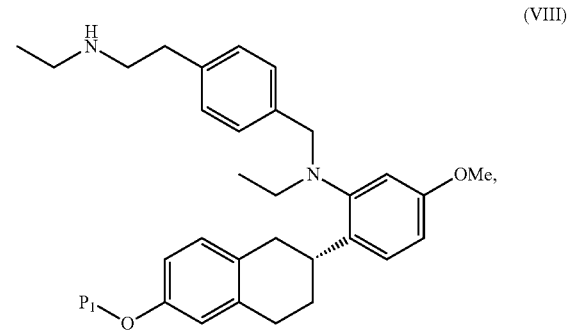

comprising the reduction of a compound of formula (VII)

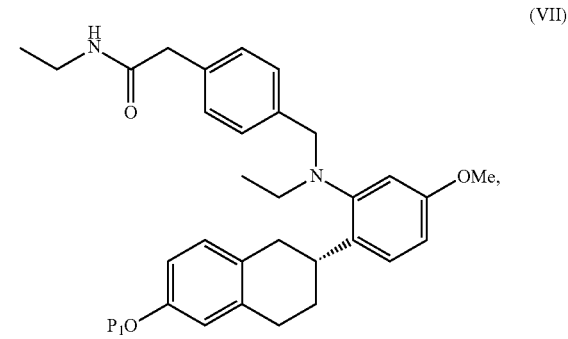

wherein said compound of formula (VII) is prepared by a reductive amination of a compound of formula (VI)

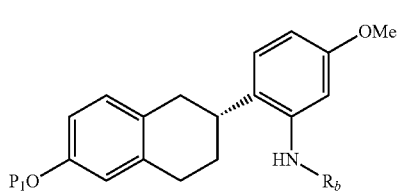

(VI)

in the presence of a compound of formula (f)

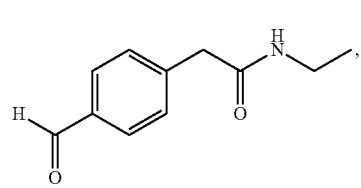

(f)

wherein said compound of formula (VI) is prepared by contacting a compound of formula (V)

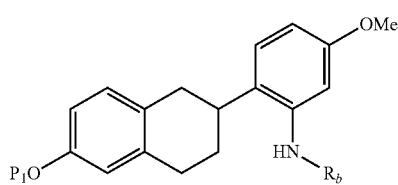

(V)

with a chiral acid to form an enantiomerically enriched salt, crystallizing the enantiomerically enriched salt, and freeing the compound of formula (VI), wherein said compound of formula (V) is prepared by treatment of a compound of formula (IV) with an acid, base, or reducing agent;

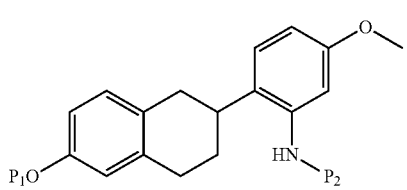

(IV)

wherein said compound of formula (IV) is prepared by reduction of a compound of formula (III)

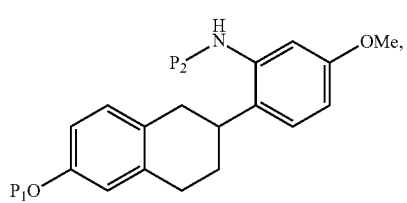

(III)

wherein said compound of formula (III) is prepared by the coupling of a compound of formula (I)

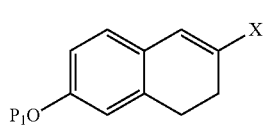

(I)

with a compound of formula (II)

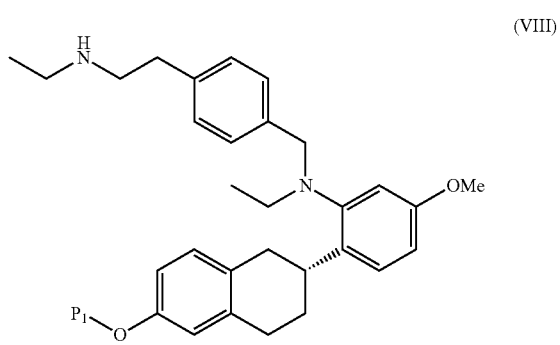

(II)

and wherein $P_1$ is H, or a phenol protecting group; $R_b$ is H or Et; $P_2$ is (C=O)—CH$_3$; X is a halogen, transition metal or boron-containing compound; and X' is a halogen, transition metal-containing function or boron-containing function; and wherein said X and X' are suitable for cross-coupling of compound (I) with compound (II).

2. A process of preparing a compound of formula (VIII):

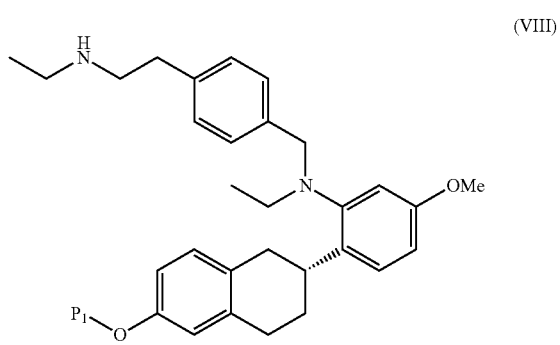

(VIII)

comprising the reduction of a compound of formula (VII):

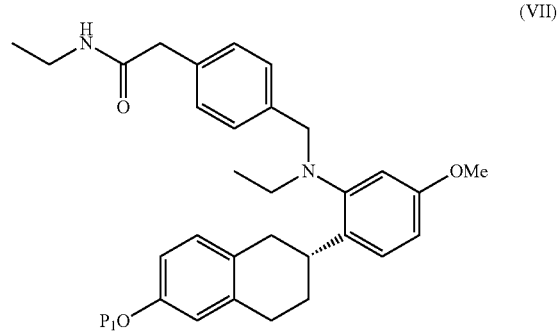

(VII)

wherein $P_1$ is H or a phenol protecting group, and wherein the compound of formula (VID) is prepared by the reaction of a compound of formula (f):

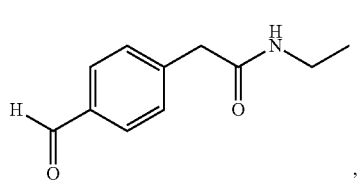
, with a compound of formula (VI)

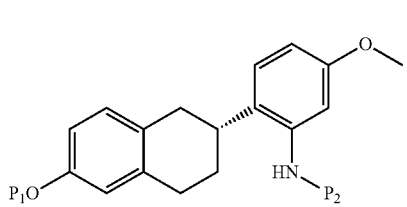

in the presence of a reducing agent wherein $R_b$ is H or Et.

3. The process of claim 2, wherein the reduction of a compound of formula (VII) is conducted in the presence of $AlH_3$, $AlH_2Cl$, $AlHCl_2$, $NaBH_4$, $LiAlH_4$, $LiBH_4$, $LiEt_3BH$, $BH_3$, $BH_3 \cdot THF$, $CH_3CH_2C(O)OBH_3Na$, $Zn(OAc)_2/(EtO)_3SiH$, $Mg/TiCL_4$, (HBpin)/tris(4,4-dimethyl-2-oxazolinyl)phenylborateMgMe or combinations thereof.

4. The process of claim 2, wherein the reducing agent for the production of a compound of formula (VII) is $NaBH(OAc)_3$.

5. The process of claim 2, further comprising a process for increasing the enantiomer excess of a compound of formula (VI):

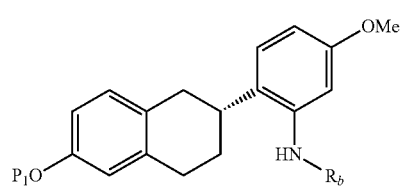

comprising contacting a compound of formula (V) with a chiral acid to form an enantiomerically enriched salt,

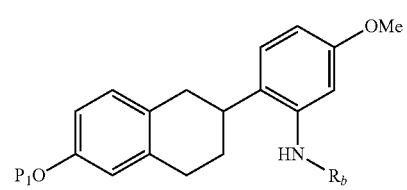

crystallizing the enantiomerically enriched salt, and freeing the compound of formula (VI).

6. The process of claim 5, wherein said enantiomeric excess of the compound of formula (VI) is >50%.

7. The process of claim 5, wherein said process uses a (+) or (−) chiral acid selected from Aspartic acid, O-Acetyl-Mandelic acid, cis-2-Benzamidocyclohexanecarboxylic acid, 1,1'-Binapthyl-2,2'-diyl hydrogen phosphate, Camphoric acid, 10-Camphorsulfonic acid, trans-1,2-Cyclohexanedicarboxylic acid, Dibenzoyl-Tartaric acid, Diacetyl-tartaric acid, Di-p-toluoyl-tartaric acid, N-(3,5-Dinitrobenzoyl)-a-phenylglycine, Diacetyl-tartaric anhydride, Diacetyl-tartaric acid, Glutamic acid, Malic acid, Mandelic acid, N-(α-methylbenzyl) phthalamic acid, 2-(6-Methoxy-2-napthyl) propionic acid, Pyroglutamic acid, Quinic acid and Tartaric acid, or combinations thereof.

8. The process of claim 5, further comprising a process of preparing a compound of formula (V):

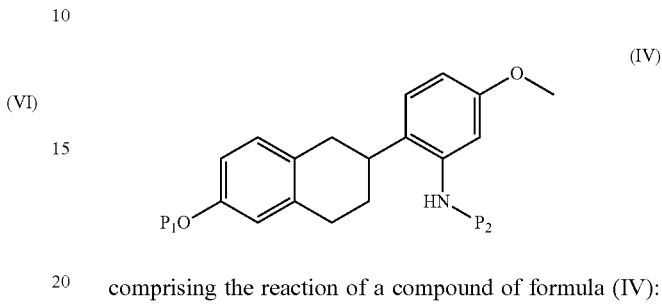

comprising the reaction of a compound of formula (IV):

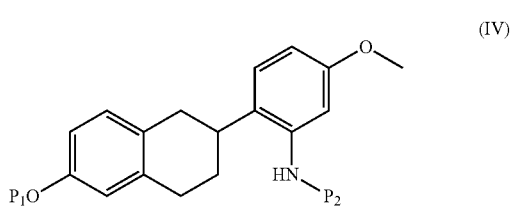

with an acid, base, nucleophile or reducing agent wherein $P_2$ is an amino-protecting group.

9. The process of claim 8, wherein the compound of formula (IV) is treated with a hydride-containing reducing agent.

10. The process of claim 8 wherein $R_b$ is H; and $P_2$ is an amino-protecting group and the compound according to formula (IV) is treated with an acid, base or nucleophile.

11. The process of claim 8, further comprising a process of preparing a compound of formula (IV):

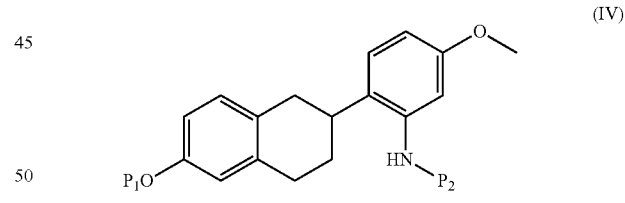

comprising the reduction of a compound of formula (III):

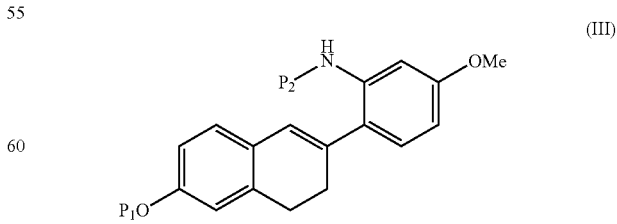

in the presence of a reducing agent.

12. The process of claim 11, wherein $P_1$ is H, or a phenol protecting group selected from (C=O)—$C_1$-$C_8$ alkyl, (C=O)-aryl, (C=O)-heteroaryl, Si(C$_1$-C$_5$ alkyl)$_3$, Si(aryl)$_2$ (C$_1$-C$_5$ alkyl) or CH$_2$Aryl; and P$_2$ is H, Et, (C=O)—C$_1$-C$_8$ alkyl, (C=O)-aryl, (C=O)-heteroaryl, (C=O)—O—C$_1$-C$_8$ alkyl, (C=O)—O-aryl, (C=O)—O-heteroaryl, (C=O)—O—C$_1$-C$_8$ alkylaryl, or —(C=O—(CH$_2$)$_n$—C=O), wherein each n is independently an integer of 2 or 3.

13. The process of claim 11, further comprising a process of preparing a compound of formula (III):

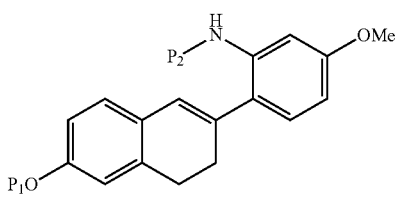

(III)

comprising the reaction of a compound of formula (I):

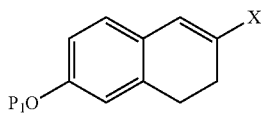

(I)

with a compound of formula (II):

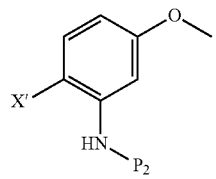

(II)

in the presence of a base and a transition metal catalyst; wherein

X is a halogen, transition metal or boron-containing compound; and

X' is a halogen, transition metal-containing function or boron-containing function, wherein said X and X' are suitable for cross-coupling of compound (I) with compound (II).

14. The process of claim 13, wherein P$_1$ is H, or a phenol protecting group selected from (C=O)—C$_1$-C$_8$ alkyl, (C=O)-aryl, (C=O)-heteroaryl, Si(C$_1$-C$_5$ alkyl)$_3$, Si(aryl)$_2$ (C$_1$-C$_5$ alkyl) and CH$_2$Aryl;

P$_2$ is H, Et, (C=O)—C$_1$-C$_8$ alkyl, (C=O)-aryl, (C=O)-heteroaryl, (C=O)—O—C$_1$-C$_8$ alkyl, (C=O)—O-aryl, (C=O)—O-heteroaryl, (C=O)—O—C$_1$-C$_8$ alkylaryl, or (C=O—(CH$_2$)$_n$—C=O)—;

X is B(OR)$_2$, B(—O—(C(R$_a$)$_2$)$_n$—O—), Cl, Br, I, OSO$_2$CF$_3$ or OSO$_2$(aryl);

X' is B(OR)$_2$, B(—O—(C(R$_a$)$_2$)$_n$—O—), Cl, Br, I, OSO$_2$CF$_3$ or OSO$_2$(aryl);

each R is independently H, C$_{1-3}$ alkyl or aryl;

each R$_a$ is independently C$_{1-3}$ alkyl or aryl; and each n is independently an integer of 2 or 3, wherein when X is B(OR)$_2$ or B(—O—(C(R$_a$)$_2$)$_n$—O—), X' is Cl, Br, I, OSO$_2$CF$_3$ or OSO$_2$(aryl).

15. The process of claim 13, conducted in the presence of a transition metal catalyst selected from the group consisting of Pd(OAc)$_2$, Pd(PPh$_3$)$_4$, PdCl$_2$(PPh$_3$)$_2$, Pd(dppf)Cl$_2$, Pd$_2$(Dba)$_3$, Cu(0), Pd(PCy$_3$)$_2$, and any combinations thereof.

16. The process of claim 13, wherein the compounds of formulas (I), (II) and (III) are (a), (aa') and (b):

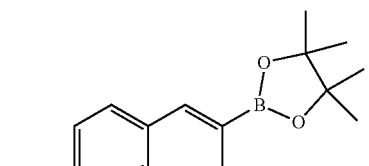

(a)

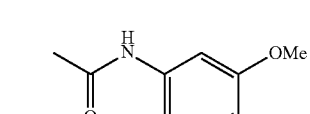

(aa')

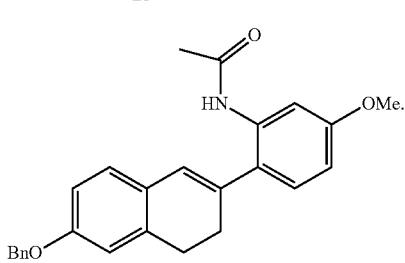

(b)

* * * * *